US010120403B2

(12) United States Patent
Nishita

(10) Patent No.: US 10,120,403 B2
(45) Date of Patent: Nov. 6, 2018

(54) ENERGY MANAGEMENT SYSTEM AND POWER INTERCHANGE METHOD

(71) Applicant: MITSUBISHI ELECTRIC CORPORATION, Chiyoda-ku (JP)

(72) Inventor: Yoshito Nishita, Tokyo (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 64 days.

(21) Appl. No.: 15/308,376

(22) PCT Filed: Dec. 26, 2014

(86) PCT No.: PCT/JP2014/084459
§ 371 (c)(1),
(2) Date: Nov. 2, 2016

(87) PCT Pub. No.: WO2015/198507
PCT Pub. Date: Dec. 30, 2015

(65) Prior Publication Data
US 2017/0045904 A1 Feb. 16, 2017

(30) Foreign Application Priority Data
Jun. 24, 2014 (JP) .................................. 2014-128799

(51) Int. Cl.
*G05F 1/66* (2006.01)
*G06Q 50/06* (2012.01)
*B60L 11/18* (2006.01)

(52) U.S. Cl.
CPC ............ *G05F 1/66* (2013.01); *B60L 11/1809* (2013.01); *B60L 11/1844* (2013.01);
(Continued)

(58) Field of Classification Search
CPC .... G05F 1/66; B60L 11/1844; B60L 11/1809; B60L 11/1846; B60L 11/1824; G06Q 50/06
See application file for complete search history.

(56) References Cited

U.S. PATENT DOCUMENTS 5,930,773 A * 7/1999 Crooks ................. G06Q 10/06
705/30
6,035,285 A * 3/2000 Schlect ................. G06Q 10/06
705/30
(Continued)

FOREIGN PATENT DOCUMENTS

| JP | 2004-015882 A | 1/2004 |
| JP | 2010-178468 A | 8/2010 |

(Continued)

OTHER PUBLICATIONS

International Search Report dated Feb. 3, 2015, in PCT/JP2014/084459, filed Dec. 26, 2014.

*Primary Examiner* — Ramesh B Patel
(74) *Attorney, Agent, or Firm* — Oblon, McClelland, Maier & Neustadt, L.L.P.

(57) ABSTRACT

A region information management unit of an energy management system manages at least part of information about a plurality of small regions that each partially include a plurality of power consumers. Each of the plurality of small regions partially overlaps at least any of the other small regions of the plurality of small regions. The region information management unit manages information about at least one belonging region of the plurality of small regions. The one power consumer belongs to the at least one belonging region. The region information management unit manages information specifying, in addition to the one power consumer, at least one other power consumer of the plurality of
(Continued)

power consumers. The other power consumer belongs to the at least one belonging region.

17 Claims, 25 Drawing Sheets

(52) U.S. Cl.
CPC .......... *G06Q 50/06* (2013.01); *B60L 11/1824* (2013.01); *B60L 11/1846* (2013.01)

(56) References Cited

U.S. PATENT DOCUMENTS

| | | | |
|---|---|---|---|
| 8,140,194 B2 | 3/2012 | Iino et al. | |
| 2009/0326726 A1* | 12/2009 | Ippolito | H02J 3/14 700/291 |
| 2011/0007076 A1* | 1/2011 | Nielsen | G06F 17/30241 345/441 |
| 2011/0029655 A1* | 2/2011 | Forbes, Jr. | G06Q 10/00 709/223 |
| 2011/0302078 A1* | 12/2011 | Failing | B60L 3/00 705/39 |
| 2013/0184887 A1* | 7/2013 | Ainsley | G05B 15/02 700/291 |
| 2014/0289080 A1* | 9/2014 | Ippolito | G06Q 10/06 705/30 |
| 2015/0213564 A1 | 7/2015 | Ishida et al. | |
| 2015/0276253 A1* | 10/2015 | Montalvo | G06Q 10/06 700/276 |
| 2015/0298565 A1* | 10/2015 | Iwamura | B60L 11/1844 701/22 |
| 2015/0372484 A1* | 12/2015 | Hong | G06Q 30/0206 700/295 |

FOREIGN PATENT DOCUMENTS

| | | |
|---|---|---|
| JP | 5100009 B2 | 12/2012 |
| WO | 2012/114372 A1 | 8/2012 |
| WO | 2014/033800 A1 | 3/2014 |

* cited by examiner

F I G. 1
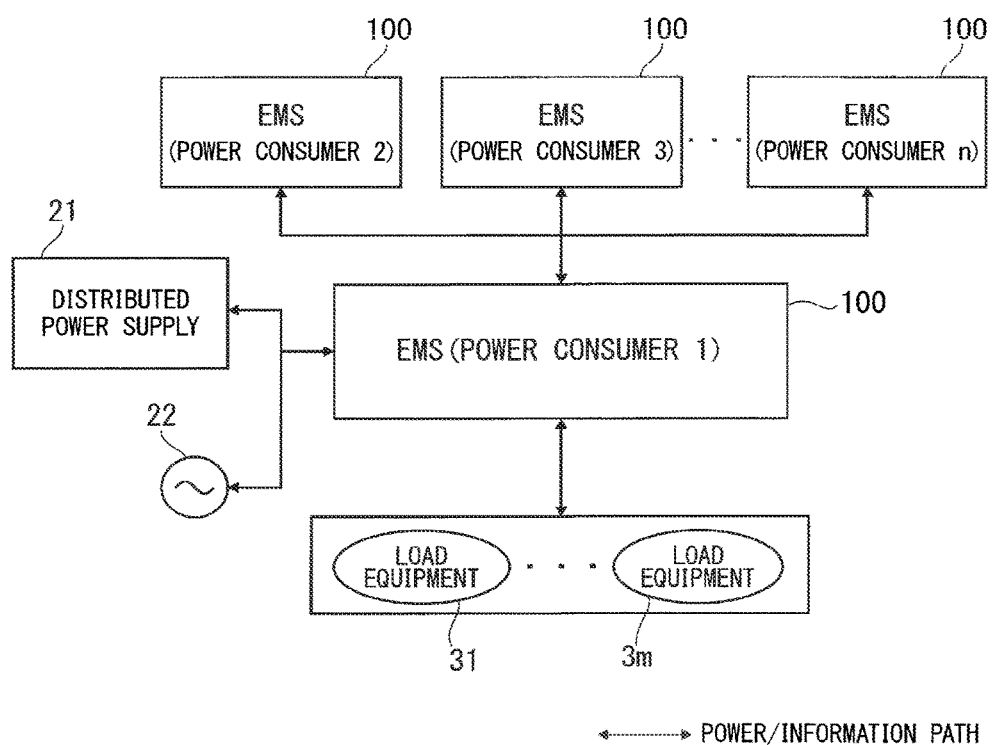

←——→ POWER/INFORMATION PATH

FIG. 7

OPERATIONAL PLAN OF EACH POWER CONSUMER AT TIME t

| POWER CONSUMER | AMOUNT OF DEMAND POWER (kWh) | AMOUNT OF GENERATED POWER (kWh) |
|---|---|---|
| POWER CONSUMER 1 | 100 | 90 |
| POWER CONSUMER 2 | 120 | 120 |
| POWER CONSUMER 3 | 90 | 90 |
| POWER CONSUMER 4 | 110 | 120 |
| POWER CONSUMER 5 | 60 | 60 |

FIG. 8

INTERCHANGE PLAN OF EACH POWER CONSUMER AT TIME t

| POWER CONSUMER | INSUFFICIENT-POWER/SURPLUS-POWER (kWh) |
|---|---|
| POWER CONSUMER 1 | −10 |
| POWER CONSUMER 2 | 0 |
| POWER CONSUMER 3 | 0 |
| POWER CONSUMER 4 | 10 |
| POWER CONSUMER 5 | 0 |

*POSITIVE REPRESENTS SURPLUS POWER AND NEGATIVE REPRESENTS POWER SHORTAGE

FIG. 9

REGION INFORMATION OF POWER CONSUMER 1

| REGION RA | REGION RB |
|---|---|
| POWER CONSUMER 2 | POWER CONSUMER 4 |

F I G. 1 0

POWER-RECEPTION/POWER-TRANSMISSION REQUEST INFORMATION OF EACH POWER CONSUMER AT TIME t

| SOURCE \ DESTINATION | POWER CONSUMER 1 | POWER CONSUMER 2 | POWER CONSUMER 3 | POWER CONSUMER 4 | POWER CONSUMER 5 |
|---|---|---|---|---|---|
| POWER CONSUMER 1 |  | -10kWh | - | -10kWh | - |
| POWER CONSUMER 2 | - |  | - | - | - |
| POWER CONSUMER 3 | - | - |  | - | - |
| POWER CONSUMER 4 | 10kWh | - | - |  | 10kWh |
| POWER CONSUMER 5 | - | - | - | - |  |

*POSITIVE VALUE REPRESENTS POWER RECEPTION REQUEST AND NEGATIVE VALUE REPRESENTS POWER TRANSMISSION REQUEST

F I G. 11

RESULT OF RESPONSE TO POWER-RECEPTION/POWER-TRANSMISSION REQUEST OF EACH POWER CONSUMER AT TIME t

| SOURCE \ DESTINATION | POWER CONSUMER 1 | POWER CONSUMER 2 | POWER CONSUMER 3 | POWER CONSUMER 4 | POWER CONSUMER 5 |
|---|---|---|---|---|---|
| POWER CONSUMER 1 | | | | | |
| POWER CONSUMER 2 | 0kWh<br>POWER CONSUMER 3 (0kWh)<br>POWER CONSUMER 5 (0kWh) | | — | -10kWh | — |
| POWER CONSUMER 3 | — | — | | — | — |
| POWER CONSUMER 4 | 10kWh | — | — | | — |
| POWER CONSUMER 5 | — | — | — | — | |

*POSITIVE VALUE REPRESENTS AMOUNT OF TRANSMITTABLE POWER AND NEGATIVE VALUE REPRESENTS AMOUNT OF RECEIVABLE POWER

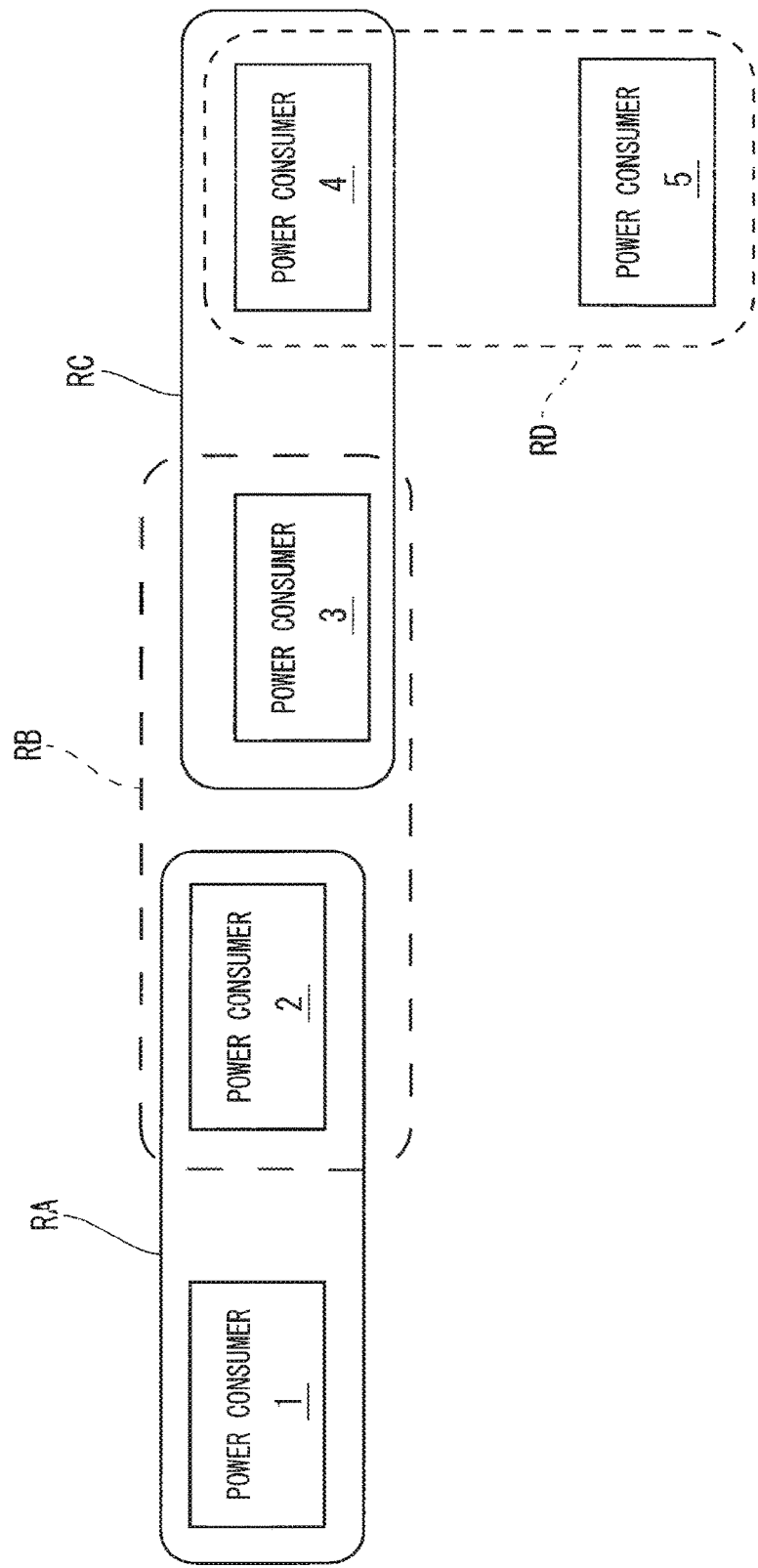

FIG. 13

OPERATIONAL PLAN OF EACH POWER CONSUMER AT TIME t

| POWER CONSUMER | AMOUNT OF DEMAND POWER (kWh) | AMOUNT OF GENERATED POWER (kWh) |
|---|---|---|
| POWER CONSUMER 1 | 100 | 90 |
| POWER CONSUMER 2 | 120 | 120 |
| POWER CONSUMER 3 | 90 | 90 |
| POWER CONSUMER 4 | 110 | 110 |
| POWER CONSUMER 5 | 50 | 60 |

F I G. 14

POWER-RECEPTION/POWER-TRANSMISSION REQUEST INFORMATION OF EACH POWER CONSUMER AT TIME t

| DESTINATION<br>SOURCE | POWER CONSUMER 1 | POWER CONSUMER 2 | POWER CONSUMER 3 | POWER CONSUMER 4 | POWER CONSUMER 5 |
|---|---|---|---|---|---|
| POWER CONSUMER 1 |  | −10kWh | — | — | — |
| POWER CONSUMER 2 | — |  | — | −10kWh | — |
| POWER CONSUMER 3 | — | — |  | — | — |
| POWER CONSUMER 4 | — | — | — |  | — |
| POWER CONSUMER 5 | — | 10kWh | 10kWh | 10kWh |  |

*POSITIVE VALUE REPRESENTS POWER RECEPTION REQUEST AND NEGATIVE VALUE REPRESENTS POWER TRANSMISSION REQUEST

F I G. 15

RESULT OF RESPONSE TO POWER-RECEPTION/POWER-TRANSMISSION REQUEST OF EACH POWER CONSUMER AT TIME t

| SOURCE \ DESTINATION | POWER CONSUMER 1 | POWER CONSUMER 2 | POWER CONSUMER 3 | POWER CONSUMER 4 | POWER CONSUMER 5 |
|---|---|---|---|---|---|
| POWER CONSUMER 1 |  | — | — | — | — |
| POWER CONSUMER 2 | 0kWh POWER CONSUMER 5 (10kWh) |  | — | — | 0kWh POWER CONSUMER 1 (-10kWh) |
| POWER CONSUMER 3 | — | — |  | — | 0kWh |
| POWER CONSUMER 4 | 0kWh POWER CONSUMER 5 (10kWh) | — | — |  | 0kWh POWER CONSUMER 1 (-10kWh) |
| POWER CONSUMER 5 | — | — | — | — |  |

*POSITIVE VALUE REPRESENTS AMOUNT OF TRANSMITTABLE POWER AND NEGATIVE VALUE REPRESENTS AMOUNT OF RECEIVABLE POWER

F I G. 16

RESULT OF RESPONSE TO POWER-RECEPTION/POWER-TRANSMISSION REQUEST OF EACH POWER CONSUMER AT TIME t

| SOURCE \ DESTINATION | POWER CONSUMER 1 | POWER CONSUMER 2 | POWER CONSUMER 3 | POWER CONSUMER 4 | POWER CONSUMER 5 |
|---|---|---|---|---|---|
| POWER CONSUMER 1 |  | −10kWh |  |  |  |
| POWER CONSUMER 2 | 10kWh |  |  |  | −10kWh |
| POWER CONSUMER 3 |  |  |  |  | 0kWh |
| POWER CONSUMER 4 |  |  |  |  |  |
| POWER CONSUMER 5 |  | 10kWh |  |  |  |

*POSITIVE VALUE REPRESENTS AMOUNT OF TRANSMITTABLE POWER AND NEGATIVE VALUE REPRESENTS AMOUNT OF RECEIVABLE POWER

F I G. 17

RESULT OF RESPONSE TO POWER-RECEPTION/POWER-TRANSMISSION REQUEST OF EACH POWER CONSUMER AT TIME t

| SOURCE \ DESTINATION | POWER CONSUMER 1 | POWER CONSUMER 2 | POWER CONSUMER 3 | POWER CONSUMER 4 | POWER CONSUMER 5 |
|---|---|---|---|---|---|
| POWER CONSUMER 1 | | — | — | — | — |
| POWER CONSUMER 2 | — | | — | −10kWh | — |
| POWER CONSUMER 3 | — | — | | — | 0kWh |
| POWER CONSUMER 4 | 10kWh | — | — | | −10kWh |
| POWER CONSUMER 5 | — | — | — | 10kWh | |

*POSITIVE VALUE REPRESENTS AMOUNT OF TRANSMITTABLE POWER AND NEGATIVE VALUE REPRESENTS AMOUNT OF RECEIVABLE POWER

FIG. 18

RESULT OF RESPONSE TO POWER-RECEPTION/POWER-TRANSMISSION REQUEST OF EACH POWER CONSUMER AT TIME t

| SOURCE \ DESTINATION | POWER CONSUMER 1 | POWER CONSUMER 2 | POWER CONSUMER 3 | POWER CONSUMER 4 | POWER CONSUMER 5 |
|---|---|---|---|---|---|
| POWER CONSUMER 1 | | -10kWh | - | - | - |
| POWER CONSUMER 2 | 10kWh | | -10kWh | - | - |
| POWER CONSUMER 3 | - | 10kWh | | -10kWh | - |
| POWER CONSUMER 4 | - | - | 10kWh | | -10kWh |
| POWER CONSUMER 5 | - | - | - | 10kWh | |

*POSITIVE VALUE REPRESENTS AMOUNT OF TRANSMITTABLE POWER AND NEGATIVE VALUE REPRESENTS AMOUNT OF RECEIVABLE POWER

F I G. 1 9

OPERATIONAL PLAN OF EACH POWER CONSUMER AT TIME t

| POWER CONSUMER | AMOUNT OF DEMAND POWER (kWh) | AMOUNT OF GENERATED POWER (kWh) |
|---|---|---|
| POWER CONSUMER 1 | 100 | 90 |
| POWER CONSUMER 2 | 120 | 120 |
| POWER CONSUMER 3 | 90 | 90 |
| POWER CONSUMER 4 | 110 | 113 |
| POWER CONSUMER 5 | 53 | 60 |

F I G. 2 0

INTERCHANGE PLAN OF EACH POWER CONSUMER AT TIME t

| POWER CONSUMER | INSUFFICIENT-POWER/SURPLUS-POWER (kWh) |
|---|---|
| POWER CONSUMER 1 | −10 |
| POWER CONSUMER 2 | 0 |
| POWER CONSUMER 3 | 0 |
| POWER CONSUMER 4 | 3 |
| POWER CONSUMER 5 | 7 |

*POSITIVE REPRESENTS SURPLUS POWER AND NEGATIVE REPRESENTS POWER SHORTAGE

F I G. 2 1

POWER-RECEPTION/POWER-TRANSMISSION REQUEST INFORMATION OF EACH POWER CONSUMER AT TIME t

| SOURCE \ DESTINATION | POWER CONSUMER 1 | POWER CONSUMER 2 | POWER CONSUMER 3 | POWER CONSUMER 4 | POWER CONSUMER 5 |
|---|---|---|---|---|---|
| POWER CONSUMER 1 |  | -10kWh | — | -10kWh | — |
| POWER CONSUMER 2 | -10kWh |  | — | — | — |
| POWER CONSUMER 3 | — | — |  | — | — |
| POWER CONSUMER 4 | 3kWh | — | — |  | 3kWh |
| POWER CONSUMER 5 | — | 7kWh | 7kWh | 7kWh |  |

*POSITIVE VALUE REPRESENTS POWER RECEPTION REQUEST AND NEGATIVE VALUE REPRESENTS POWER TRANSMISSION REQUEST

F I G. 2 2

RESULT OF RESPONSE TO POWER-RECEPTION/POWER-TRANSMISSION REQUEST OF EACH POWER CONSUMER AT TIME t

| SOURCE \ DESTINATION | POWER CONSUMER 1 | POWER CONSUMER 2 | POWER CONSUMER 3 | POWER CONSUMER 4 | POWER CONSUMER 5 |
|---|---|---|---|---|---|
| POWER CONSUMER 1 | | — | — | — | — |
| POWER CONSUMER 2 | 0kWh POWER CONSUMER 5 (7kWh) | | — | — | 0kWh POWER CONSUMER 1 (-3kWh) |
| POWER CONSUMER 3 | — | — | | — | 0kWh |
| POWER CONSUMER 4 | 3kWh POWER CONSUMER 5 (7kWh) | — | — | | — |
| POWER CONSUMER 5 | — | — | — | -3kWh | |

*POSITIVE VALUE REPRESENTS AMOUNT OF TRANSMITTABLE POWER AND NEGATIVE VALUE REPRESENTS AMOUNT OF RECEIVABLE POWER

FIG. 23

RESULT OF RESPONSE TO POWER-RECEPTION/POWER-TRANSMISSION REQUEST OF EACH POWER CONSUMER AT TIME t

| SOURCE \ DESTINATION | POWER CONSUMER 1 | POWER CONSUMER 2 | POWER CONSUMER 3 | POWER CONSUMER 4 | POWER CONSUMER 5 |
|---|---|---|---|---|---|
| POWER CONSUMER 1 |  | −7kWh | — | — | — |
| POWER CONSUMER 2 | 7kWh |  | — | −3kWh | −7kWh |
| POWER CONSUMER 3 | — | — |  | — | 0kWh |
| POWER CONSUMER 4 | 3kWh | — | — |  | — |
| POWER CONSUMER 5 | — | 7kWh | — | — |  |

*POSITIVE VALUE REPRESENTS AMOUNT OF TRANSMITTABLE POWER AND NEGATIVE VALUE REPRESENTS AMOUNT OF RECEIVABLE POWER

FIG. 24

RESULT OF RESPONSE TO POWER-RECEPTION/POWER-TRANSMISSION REQUEST OF EACH POWER CONSUMER AT TIME t

| SOURCE \ DESTINATION | POWER CONSUMER 1 | POWER CONSUMER 2 | POWER CONSUMER 3 | POWER CONSUMER 4 | POWER CONSUMER 5 |
|---|---|---|---|---|---|
| POWER CONSUMER 1 | | — | — | — | — |
| POWER CONSUMER 2 | 0kWh | | — | −10kWh | 0kWh |
| POWER CONSUMER 3 | 10kWh | — | | — | 0kWh |
| POWER CONSUMER 4 | — | — | — | | −7kWh |
| POWER CONSUMER 5 | — | — | — | 7kWh | |

*POSITIVE VALUE REPRESENTS AMOUNT OF TRANSMITTABLE POWER AND NEGATIVE VALUE REPRESENTS AMOUNT OF RECEIVABLE POWER

ENERGY MANAGEMENT SYSTEM AND POWER INTERCHANGE METHOD

TECHNICAL FIELD

The present technology relates to an energy management system and a power interchange method, and more particularly, to a power interchange method between a plurality of power consumers that each include a distributed power supply and load equipment and that are connected to each other by a power path and an information path, and to an energy management system that manages the power interchange method.

BACKGROUND ART

In recent years, to power consumers, the introduction of distributed power supplies such as renewable energy like solar-electric power generation, self-power generation, and storage batteries has been advanced, and energy management systems for cooperatively controlling them have been developed. A technology for interchanging power in such a manner as to supply surplus power and to procure insufficient power according to varying power supply and power consumption by not only the single energy management system that controls the distributed power supplies under the management thereof but also by the energy management systems that cooperate/collaborate with each other will be further needed.

Patent Document 1 proposes a power system in which a plurality of power consumers judge the presence or absence of a power shortage or a power surplus therein, one consumer at occurrence of the power shortage receiving power from the other consumer, one consumer at occurrence of the power surplus supplying power to the other consumer.

Patent Document 2 proposes a power demand management system that causes a power consumer in which surplus power will occur to perform a power interchange by specifying a power apparatus of a power consumer located close to its own power consumer and by notifying the consumer of an estimated time period of the occurrence of the surplus power and an amount of power less than or equal to the amount of surplus power.

PRIOR ART DOCUMENT

Patent Document

Patent Document 1: Japanese Patent No. 5100009
Patent Document 2: International Patent Publication No. WO2012/114372

SUMMARY OF INVENTION

Problems to be Solved by the Invention

The notifications of the surplus power or the power shortage are provided between all the power consumers in the power system disclosed in Patent Document 1. Thus, the more power consumers increase the calculation load of the power system, so that efficiency of processing is reduced.

The power demand management system disclosed in Patent Document 2 tries to find a power consumer at the other end of the power interchange from power consumers located in the vicinity. However, the power consumers located in the vicinity do not necessarily accept the request, and thus the power consumer with which the power interchange is to be performed cannot be found frequently in an early stage. For this reason, the power consumer at the other end of the power interchange cannot be found efficiently.

The present technology has been made in view of the above mentioned problems, and an object thereof is to efficiently find a power consumer at the other end of a power interchange.

Means to Solve the Problems

An energy management system of the present invention relates to one energy management system provided in one power consumer in a case where the energy management system is provided in each of a plurality of power consumers to manage a power interchange between the plurality of power consumers that each include a distributed power supply and load equipment and that are connected to each other by a power path and an information path. The energy management system includes an information transmitter, an information receiver, and a region information management unit. The information transmitter transmits information to the information path. The information receiver receives information from the information path. The region information management unit manages at least part of information about a plurality of small regions that each partially include the plurality of power consumers. Each of the plurality of small regions partially overlaps at least any of the other small regions of the plurality of small regions. The region information management unit manages information about at least one belonging region of the plurality of small regions, the one power consumer belonging to the at least one belonging region, and information specifying, in addition to the one power consumer, at least one other power consumers of the plurality of power consumers, the other power consumer belonging to the at least one belonging region.

A power interchange method of the present invention relates to a power interchange method performed between a plurality of power consumers that each include a distributed power supply and load equipment and that are connected to each other by a power path and an information path, and the power interchange method includes following steps. A step of forming a plurality of small regions that each partially include the plurality of power consumers is performed. Each of the plurality of power consumers belongs to at least one of the plurality of small regions. Each of the plurality of small regions partially overlaps at least any of the other small regions of the plurality of small regions. A step of exchanging information between the plurality of power consumers using the information path within an area of each of the small regions is performed. A step of interchanging power between the plurality of power consumers is performed after the step of exchanging information using the information path.

Effects of the Invention

According to the present invention, first, the exchange of information using the information path is performed within the area of each of the small regions. In a case where the power interchange cannot be performed sufficiently within the area of each of the small regions, the outside of the area of the specific small region may be searched for a power consumer by using the overlap between the small regions. Such a configuration can reduce the amount of information dealt at a time in comparison to a case in which all the power consumers comprehensively exchange information with one another. Furthermore, a destination of the interchange can be found in an early stage in comparison to a case in which one exchange of information at a time between the power consumers is successively performed. Therefore, the power consumer at the other end of the power interchange can be efficiently found.

These and other objects, features, aspects and advantages of the present technology will become more apparent from the following detailed description of the present technology when taken in conjunction with the accompanying drawings.

BRIEF DESCRIPTION OF DRAWINGS

FIG. 1 is a diagram showing power consumers including energy management systems (EMSs) according to a first embodiment of the present invention.

FIG. 7 is a diagram showing an example of an operational plan generated by an operation planning unit of the energy management system provided in each of the power consumers shown in FIG. 3.

FIG. 8 is a diagram showing one example of the power interchange plan generated by a power interchange planning unit of the energy management system provided in each of the power consumers shown in FIG. 3.

FIG. 9 is a diagram showing an example of region information managed by a region information management unit shown in FIG. 4.

FIG. 10 is a diagram showing an example of request information generated by a request information generation unit of the energy management system provided in each of the power consumers shown in FIG. 3.

FIG. 11 is a diagram showing an example of response information generated by a response information generation unit of the energy management system provided in each of the power consumers shown in FIG. 3.

FIG. 12 is a diagram showing a modification of FIG. 3.

FIG. 13 is a diagram showing an example of an operational plan generated by an operation planning unit of an energy management system provided in each power consumer in a second embodiment of the present invention.

FIG. 14 is a diagram showing an example of request information generated by a request information generation unit of the energy management system provided in each of the power consumers in the second embodiment of the present invention.

FIG. 15 is a diagram showing an example of response information generated by a response information generation unit of the energy management system provided in each of the power consumers in the second embodiment of the present invention.

FIG. 16 is a diagram showing a first example of response information generated by a response information generation unit of an energy management system provided in each power consumer in a third embodiment of the present invention.

FIG. 17 is a diagram showing a second example of the response information generated by the response information generation unit of the energy management system provided in each of the power consumers in the third embodiment of the present invention.

FIG. 18 is a diagram showing a third example of the response information generated by the response information generation unit of the energy management system provided in each of the power consumers in the third embodiment of the present invention.

FIG. 19 is a diagram showing an example of an operational plan generated by an operation planning unit of an energy management system provided in each power consumer in a fourth embodiment of the present invention.

FIG. 20 is a diagram showing one example of a power interchange plan generated by a power interchange planning unit of the energy management system provided in each of the power consumers in the fourth embodiment of the present invention.

FIG. 21 is a diagram showing an example of request information generated by a request information generation unit of the energy management system provided in each of the power consumers in the fourth embodiment of the present invention.

FIG. 22 is a diagram showing an example of response information generated by a response information generation unit of the energy management system provided in each of the power consumers in the fourth embodiment of the present invention.

FIG. 23 is a diagram showing a first example of response information generated by a response information generation unit of an energy management system provided in each power consumer in a fifth embodiment of the present invention.

FIG. 24 is a diagram showing a second example of the response information generated by the response information generation unit of the energy management system provided in each of the power consumers in the fifth embodiment of the present invention.

DESCRIPTION OF EMBODIMENTS

Figure 2:
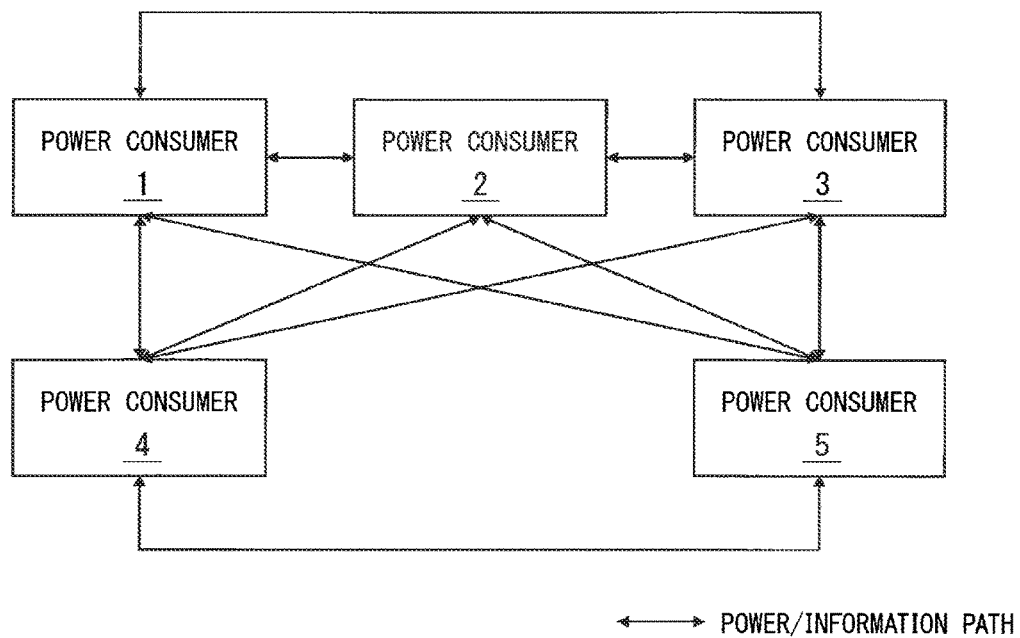
FIG. 2 is a diagram of relationships between the power consumers according to the first embodiment of the present invention.

Hereinafter, each embodiment is described with reference to the accompanying drawings. In the following drawings, the same or corresponding components have the same reference numerals, and their detailed description will not be repeated.

<First Embodiment>

FIG. 1 shows power consumers 1, 2 . . . n each including an energy management system (EMS) 100. Although the power consumers 1, 2 . . . n are typically facilities such as houses, collective housing, factories, and office buildings, the power consumers 1, 2 . . . n are not limited to the facilities and may be, for example, a piece of equipment or pieces of equipment in the facilities. The power consumers 1 to n each include a distributed power supply 21, a centralized power supply 22, and load equipment 31 . . . 3m, although only those of the power consumer 1 as a representative are shown. Examples of the distributed power supply 21 include renewable energy equipment such as solar-electric power generation and wind power generation, self-power generating equipment, and storage equipment such as storage batteries that store and supply power. Examples of the load equipment 31 . . . 3m include lighting apparatuses and air conditioning apparatuses.

The power consumers 1, 2 . . . n each include the EMS 100. The EMS 100 manages information about the distributed power supply 21 and the load equipment 31 . . . 3m of its own power consumer. The EMS 100 further manages a power interchange between its own power consumer and another power consumer. The power consumers 1 to n are connected to one another by power paths and information paths (arrows in the diagram). Each of the EMSs 100 forms an EMS group by using the paths and controls/manages transmission and reception of power and information between the power consumers.

FIG. 2 shows an example of relationships among the power consumers 1 to 5. All of the power consumers 1 to 5 are connected to one another by the power paths and the information paths (power/information path). The power consumers 1 to 5 form one community.

Figure 3:
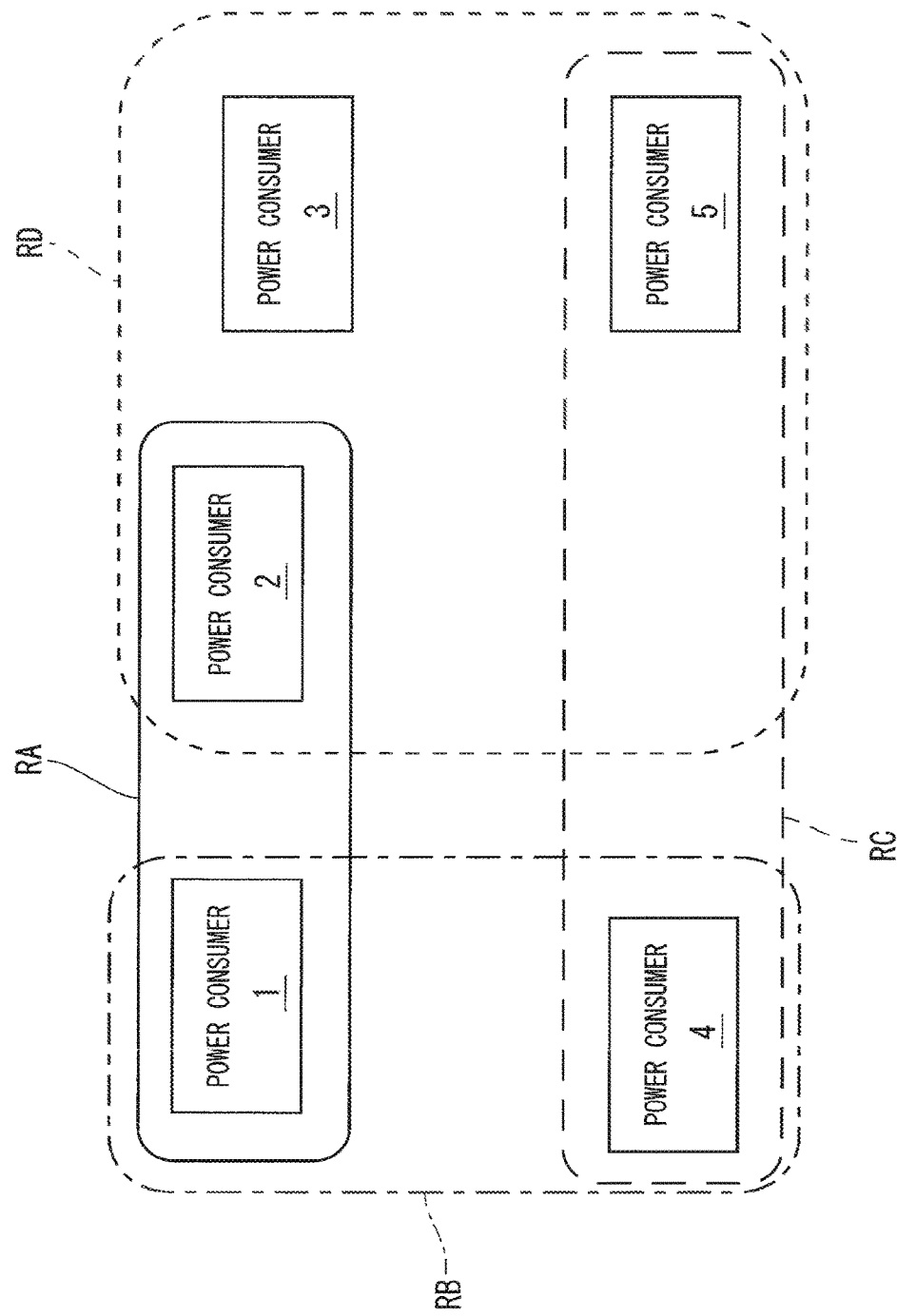
FIG. 3 is a diagram showing a configuration of small regions formed in the first embodiment of the present invention.

FIG. 3 shows small regions RA to RD formed in this embodiment. In the diagram, each of the power consumers 1 to 5 belongs to at least one of the small regions RA to RD. The term "small region" refers to a region that partially includes two or more power consumers among the power consumers which form the one community. In other words, each of the small regions RA to RD partially includes the power consumers 1 to 5 and includes two or more of the power consumers 1 to 5.

For example, the power consumer 1 belongs to the small region RA to which the power consumer 2 belongs, and the small region RB to which the power consumer 4 belongs. The power consumer 2 belongs to the small region RA, and the small region RD to which the power consumers 3 and 5 belong. The power consumer 5 belongs to the small region RD, and the small region RC to which the power consumer 4 belongs. The power consumer 4 belongs to the small regions RB and RC.

Each of the small regions RA to RD partially overlaps at least any of the other small regions of the small regions RA to RD. For example, the small region RA overlaps the small region RB in the power consumer 1 and overlaps the small region RD in the power consumer 2. The small regions RA to RD are integrated by the connections of the overlaps between the small regions RA to RD, and thus the small regions RA to RD are formed so as not to form portions of the small regions RA to RD isolated from one another. While the above-mentioned conditions are satisfied, the small regions RA to RD are formed on the basis of information about a distance between the power consumers, a transmission loss in the power interchange, a transmission capacity of the power path between the power consumers, or the like.

The small regions RA to RD may be formed (defined) by the functions of the EMS 100, formed by an apparatus located outside the EMS, or formed by hand.

Figure 4:
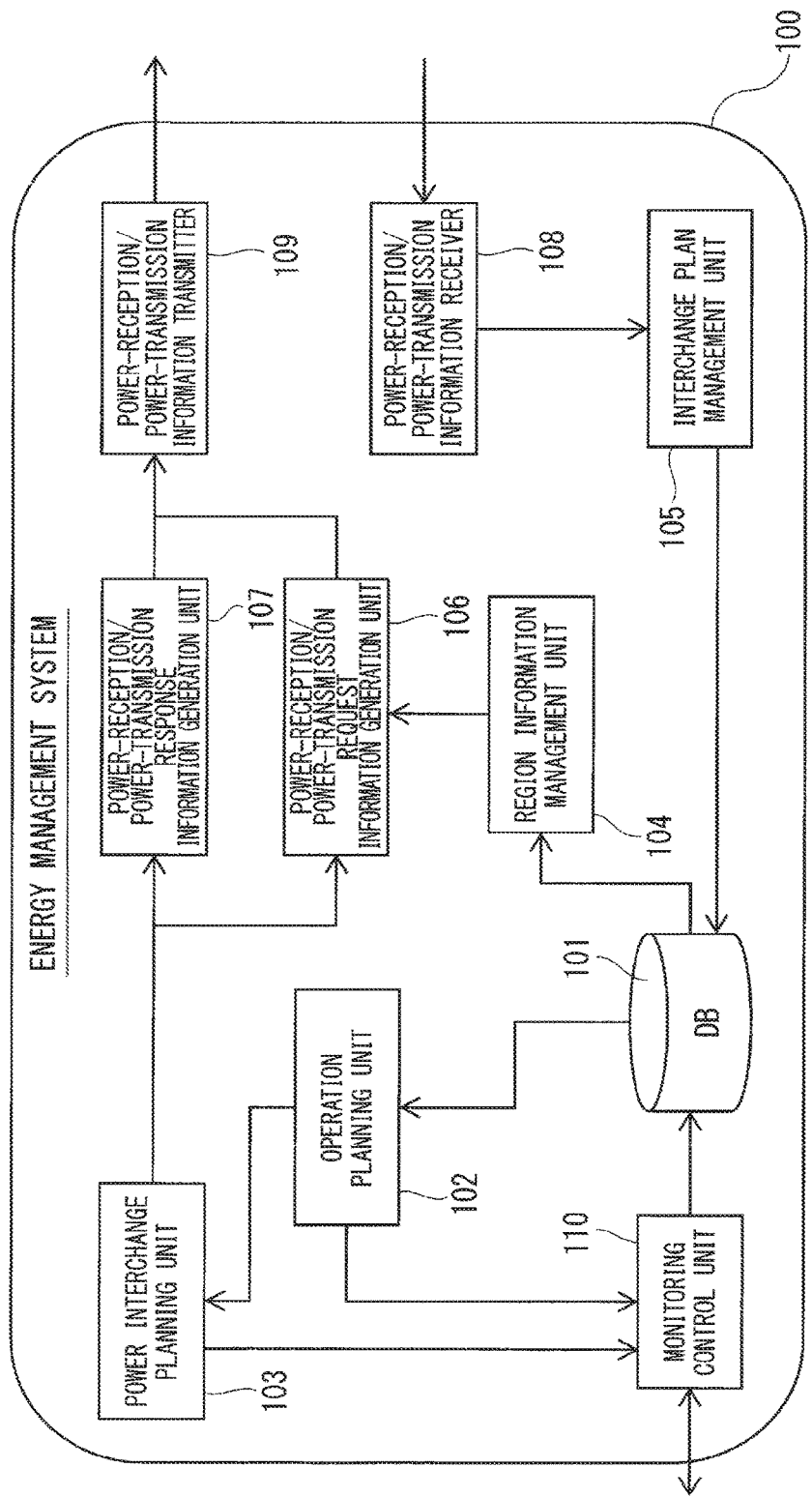
FIG. 4 is a diagram schematically showing a configuration of the energy management system according to the first embodiment of the present invention.

With reference to FIG. 4, an overview of the configuration of the EMS 100 is described. Hereinafter, one EMS, which is a subject of the description of the configuration, may be referred to as a "present EMS", and the other EMSs may be referred to as "the other EMS". A power consumer provided with the "present EMS" may be referred to as "its own power consumer", and the others may be referred to as "the other power consumer", which is the power consumer provided with "the other EMS".

The present EMS 100 includes a database (DB) 101, an operation planning unit 102, a power interchange planning unit 103, a region information management unit 104, an interchange plan management unit 105, a power-reception/power-transmission request information generation unit 106, a power-reception/power-transmission response information generation unit 107, a power-reception/power-transmission information receiver 108, a power-reception/power-transmission information transmitter 109, and a monitoring control unit 110.

The monitoring control unit 110 manages and controls the distributed power supply 21 (FIG. 1) or the like, and monitors and controls power reception and power transmission from and to the other power consumer. The monitoring control unit 110 stores results of monitoring in the DB 101. Monitoring and control are performed on the basis of a power interchange plan or an operational plan, which will be described below. The monitoring control unit 110 may be an external function of the present EMS 100.

The region information management unit 104 manages at least part of information about the plurality of small regions. Specifically, the region information management unit 104 manages information about a belonging region being a small region of the plurality of small regions to which its own power consumer belongs and information specifying the other power consumer that belongs to the belonging region.

On the basis of the information about states of the distributed power supply 21 and the load equipment 31 . . . 3m (FIG. 1) stored in the DB 101 by the monitoring control unit 110, the operation planning unit 102 generates operational plans of the distributed power supply 21 and the load equipment 31 . . . 3m. In other words, the operation planning unit 102 generates a power supply plan of its own power consumer.

The power interchange planning unit 103 generates a power interchange plan of its own power consumer on the basis of the operational plans planned by the operation planning unit 102 and request information from the other EMS 100 about power-reception/power-transmission. In a case where the present EMS 100 has not obtained the request information that needs to be taken into consideration from the other EMS 100, the power interchange planning unit 103 generates the power interchange plan of its own power consumer on the basis of the operational plans planned by the operation planning unit 102.

The power-reception/power-transmission request information generation unit 106 generates request information based on the power interchange plan. The power-reception/power-transmission request information generation unit 106 also causes the power-reception/power-transmission information transmitter 109 to transmit the request information to the other power consumer specified by the region information management unit 104. The request information relates to power-reception/power-transmission requests to the other EMS 100 in a case where a power shortage or surplus power occurs in its own power consumer. The power-reception request is a request to the other power consumer to receive the surplus power occurring in its own power consumer, and also includes information about the amount of surplus power and estimated time of the occurrence. The power-transmission request is a request to the other power consumer to transmit power in order to compensate the power shortage occurring in the power consumer of its own power consumer, and also includes information about the amount of insufficient power and estimated time of the occurrence.

The power-reception/power-transmission response information generation unit 107 generates response information to the other power consumer on the basis of each power interchange plan of its own power consumer and the other power consumer. The response information relates to power-reception/power-transmission responses to the other EMS 100 in response to the request information received from the other EMS 100. The power-reception response is an answer from its own power consumer receiving the notification about the surplus power that will occur in the other power consumer, and also includes information about the amount of receivable power and estimated time of the power reception in addition to information about whether or not to allow the power reception. The power-transmission response is an answer from its own power consumer receiving the notification about the power shortage that will occur in the other power consumer, and also includes information about the amount of transmittable power and estimated time of the power transmission in addition to information about whether or not to allow the power transmission.

The power-reception/power-transmission information receiver 108 receives the information from the information path. Specifically, the power-reception/power-transmission information receiver 108 receives the request information and the response information respectively generated by the power-reception/power-transmission request information generation unit 106 and the power-reception/power-transmission response information generation unit 107 of the other EMS 100.

The interchange plan management unit 105 manages the request information or the response information of the other power consumer received by the power-reception/power-transmission information receiver 108 from the other power consumer. The request information or the response information is generated by the power-reception/power-transmission request information generation unit 106 or the power-reception/power-transmission response information generation unit 107 of the other EMS 100.

The power-reception/power-transmission information transmitter 109 transmits the information to the information path. Specifically, the power-reception/power-transmission information transmitter 109 transmits the request information and the response information respectively generated by the power-reception/power-transmission request information generation unit 106 and the power-reception/power-transmission response information generation unit 107 of the present EMS 100.

Figure 5:
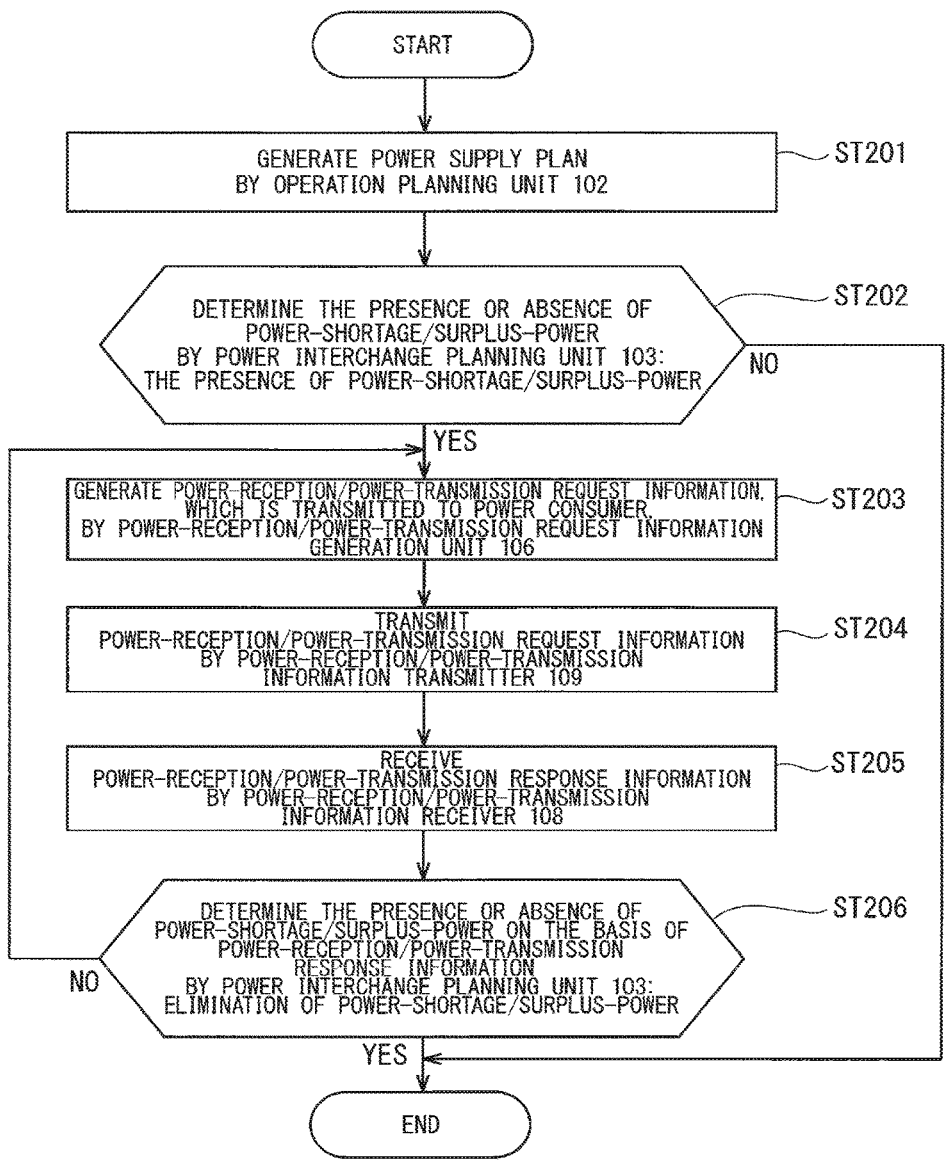
FIG. 5 is a flowchart schematically showing up to generation of a power interchange plan for a power-shortage/surplus-power in one power consumer, according to the first embodiment of the present invention.

FIG. 5 schematically shows features up to generation of the power interchange plan for the power-shortage/surplus-power in its own power consumer.

In Step ST201, first, the operation planning unit 102 generates the power supply plan of its own power consumer. In ST202, the power interchange planning unit 103 generates the interchange plan on the basis of the power supply plan and determines the presence or absence of the power-shortage/surplus-power in its own power consumer.

For the occurrence of the power-shortage/surplus-power, the power-reception/power-transmission request information generation unit 106 generates the power-reception/power-transmission request information on the basis of the state of the power-shortage/surplus-power in Step ST203. The process of generating the request information includes a process of deciding, from the other power consumers, a destination of the request information. In Step ST204, the power-reception/power-transmission information transmitter 109 transmits the power-reception/power-transmission request information to the other power consumer. Then, in Step ST205, the power-reception/power-transmission information receiver 108 receives the power-reception/power-transmission response information as the result of the response from the other consumer to the above-mentioned power-reception/power-transmission request information. The power-reception/power-transmission response information are managed by the interchange plan management unit 105. Then, in Step ST206, the power interchange planning unit 103 manages the interchange plan with reference to the power-shortage/surplus-power of its own power consumer and the result of the response from the other power consumer. When it is judged that the power-shortage/surplus-power occurring in its own power consumer are eliminated under this management, the process ends. When it is judged that the power-shortage/surplus-power are not eliminated, the process is repeated by returning to Step ST203.

Figure 6:
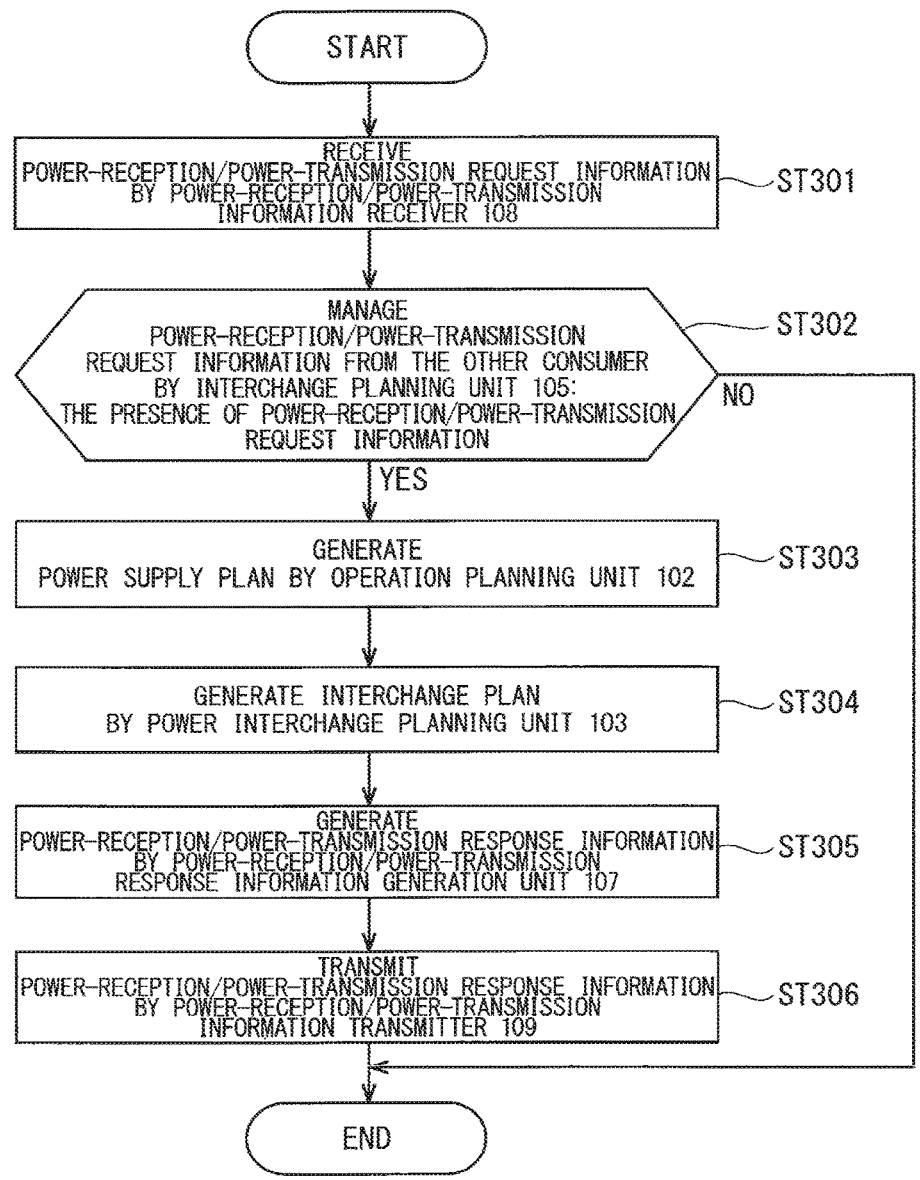
FIG. 6 is a flowchart schematically showing up to generation of a power interchange plan for a power-shortage/surplus-power in the other power consumer, according to the first embodiment of the present invention.

FIG. 6 schematically shows features up to generation of the power interchange plan for the power-shortage/surplus-power in the other power consumer.

In Step ST301 (related to Step ST204 in FIG. 5), first, the power-reception/power-transmission information receiver 108 receives the power-reception/power-transmission requests transmitted from the other power consumer (corresponding to its own power consumer in FIG. 5). In Step ST302, the interchange plan management unit 105 manages the received power-reception/power-transmission requests.

In the presence of the power-reception/power-transmission requests from the other power consumer, the operation planning unit 102 generates the power supply plan in Step ST303. In Step ST304, the power interchange planning unit 103 generates the interchange plan on the basis of the power supply plan. In Step ST305, the power-reception/power-transmission response information generation unit 107 generates the response information to the power-reception/power-transmission requests on the basis of the interchange plan. The process of generating the response information includes a process of deciding, from the other power consumers, a destination of the response information. In Step ST306 (related to Step ST205 in FIG. 5), the power-reception/power-transmission information transmitter 109 transmits the response information to the other power consumer (corresponding to its own power consumer in FIG. 5).

Next, the details of each of the units forming the EMS 100 are described below while specific examples of their operations are shown.

FIG. 7 shows an example of the operational plan generated by the operation planning unit 102 of the EMS 100 provided in each of the power consumers 1 to 5 (FIG. 3). Each of the operation planning units 102 generates the power supply plan on the basis of a predicted power demand value, a predicted power generation value of renewable energy such as solar-electric power generation, and states (such as the possible amount of power generation, the storage amount of a storage battery, and charging and discharging capacity) of power generation equipment such as the storage battery, in its own power consumer. The diagram shows one example of the operational plan of each of the power consumers at a time t. The operation planning unit 102 at least calculates the amount of demand power that is electric power consumed by the load equipment and the amount of supply power that is supplied by the power generation equipment or the like in the power consumer.

FIG. 8 shows the power interchange plan, which is generated by the power interchange planning unit 103 in each of the EMSs 100 on the basis of the operational plan (FIG. 7), at the time t. The power interchange planning unit 103 determines the presence or absence of the power-shortage/surplus-power at every time and calculates the amount of insufficient power and the amount of surplus power from the power supply plan generated by the operation planning unit 102.

FIG. 9 shows an example of region information managed by the region information management unit 104 of the EMS 100 provided in the power consumer 1 (FIG. 3). The region information management unit 104 manages information about the small region to which its own power consumer belongs and information about the other power consumer belonging to the small region. Specifically, the region information includes the information that the power consumer 1 belongs to the small regions RA and RB, the information that the power consumer 2 belongs to the small region RA in addition to the power consumer 1, and the information that the power consumer 4 belongs to the small region RB in addition to the power consumer 1.

The information about the power consumer is information for specifying a power consumer at the other end of the power interchange. The information is preferably indicated by the EMS identification ID (identification number or identification symbol) or the power consumer ID. In this case, the region information management unit 104 holds the identification ID for identifying each of the other power consumers. Thus, the other power consumers can be easily identified.

FIG. 10 shows an example of the request information generated by the power-reception/power-transmission request information generation unit 106 of the EMS 100 provided in each of the power consumers 1 to 5 (FIG. 3). The power-reception/power-transmission request information generation unit 106 decides the amount of power for the power-reception/power-transmission requests on the basis of the interchange plan calculated by the power interchange planning unit 103, and decides destinations of the power-reception/power-transmission requests on the basis of the information about the power consumers held by the region information management unit 104. For example, the power-reception/power-transmission request information generation unit 106 of the EMS 100 in the power consumer 1 decides to transmit the power-transmission request to the power consumer 2 and the power consumer 4 on the basis of the region information held by the region information management unit 104 because a power shortage of 10 kWh occurs in the power interchange planning unit 103. Each of the power consumers also performs the similar process to decide destinations of the power-reception/power-transmission requests. Although the amount of power of power-shortage/surplus-power is decided only in the presence of the power-shortage/surplus-power and no transmission is performed in the absence of the power-shortage/surplus-power in the diagram, request information indicating 0 kWh may be transmitted to the other power consumer in the latter case.

FIG. 11 shows an example of the response information generated by the power-reception/power-transmission response information generation unit 107 of the EMS 100 provided in each of the power consumers 1 to 5 (FIG. 3). The power-reception/power-transmission response information generation unit 107 generates contents of the response to the request from the other power consumer on the basis of the interchange plan of its own power consumer calculated by the power interchange planning unit 103 and the power-reception/power-transmission request information (FIG. 10) of the other power consumer received by the power-reception/power-transmission information receiver 108. For example, the power-reception/power-transmission response information generation unit 107 of the EMS 100 in the power consumer 1 grasps that the surplus power of 10 kWh occurs in the power consumer 4 via the interchange plan management unit 105, and also grasps that the power shortage of 10 kWh occurs in the power consumer 1 via the power interchange planning unit 103. Thus, it is decided to transmit the response information about the power reception of 10 kWh to the power-transmission request of the power consumer 4. Each of the other power consumers also performs the similar process to decide the destinations of the power-reception/power-transmission requests.

The power-reception/power-transmission response information generation unit 107 includes the information "0 kWh" in the response information when the power-reception/power-transmission requests cannot be handled. At this time, when its own power consumer belongs to the two or more small regions, the power-reception/power-transmission response information generation unit 107 also includes, in the response information, the information (ID, the amount of receivable/transmittable power) about the other power consumer belonging to the small region to which its own power consumer belongs and to which the power consumer as the destination does not belong.

For example, the power consumer 2 (one power consumer) cannot satisfy the interchange of power based on the power-transmission request received from the power consumer 1 (first power consumer), so that the response information generated by the power-reception/power-transmission response information generation unit 107 of the power consumer 2 includes the information "0 kWh".

The response information also includes information about the power consumers 3 and 5 (specifically, the identification IDs thereof) belonging to the small region RD (see FIG. 3) to which the power consumer 2 belongs and the power consumer 1 does not belong. The response information also includes information "(0 kWh)" indicating the amount of power, which can be handled by the power consumers 3 and 5, of the interchange of power based on the power-transmission request information received by the power consumer 2 from the power consumer 1. The information may be used for specifying the power consumer as the destination when the power consumer 1 that has received the information needs to further transmit the power-reception/power-transmission requests.

The above-mentioned transmission is performed when the small region to which its own power consumer belongs includes not only a first belonging region to which a first power consumer included in the other power consumers belongs, but also a second belonging region to which a second power consumer included in the other power consumers belongs and the first power consumer does not belong. In the case of FIG. 11, as shown in FIG. 3, of the small regions RA to RD, the belonging region to which the power consumer 2 belongs includes the small region RA (the above-mentioned first belonging region) to which the power consumer 1 (the above-mentioned first power consumer) belongs and the small region RD to which the power consumers 3 and 5 (the above-mentioned second power consumer) belong and the power consumer 1 does not belong. Consequently, the information about the power consumers 3 and 5 is also transmitted to the power consumer 1. Thus, when the power consumer 1 that has received the response information needs to further transmit the power-reception/power-transmission requests (which do not need to be transmitted in the example of FIG. 11), it can be easily decided to which power consumer the power-reception/power-transmission requests need to be transmitted.

As described above, the power interchange at the time t between the power consumers 1 and 4 is planned. This can eliminate the power shortage and the surplus power of the power consumers 1 to 5 at the time t.

As a modification herein, a case in which configurations of the small regions RA to RD shown in FIG. 12 are formed instead of those shown in FIG. 3 is described. In this case, the power consumer 1 transmits the power-transmission request to only the power consumer 2 belonging to the same small region RA. The power consumer 2 cannot satisfy the power-transmission request, so that the power consumer 2 transmits the information about the power consumer 3 belonging to the small region RB together with the information "0 kWh" to the power consumer 1. In response to this, the power consumer 1 transmits the power-transmission request to the power consumer 3. The power consumer 3 cannot satisfy the power-transmission request, so that the power consumer 3 transmits the information about the power consumer 4 belonging to the small region RC together with the information "0 kWh" to the power consumer 1. In response to this, the power consumer 1 transmits the power-transmission request to the power consumer 4. The power consumer 4 can satisfy the power-transmission request, and thus the power interchange between the power consumers 1 and 4 is achieved. In other words, the power interchange between the small regions RA and RC, which do not overlap each other, is achieved. This is made possible by the small region RB located so as to connect the small region RA and the small region RC.

Next, the general outlines of a power interchange method in this embodiment are described.

First, the small regions RA to RD (FIG. 3) are formed (defined) in the community (FIG. 2) composed of the power consumers 1 to 5. The information about the small regions RA to RD that have been formed may be stored in the DB 101 by an input unit (not shown) of the EMS 100. Alternatively, as described in a sixth embodiment, for example, the EMS 100 itself may have the function of forming the small regions RA to RD.

Next, as described above, the power consumers 1 to 5 exchange information with one another using the information path within an area of each of the small regions RA to RD. In other words, the power-reception/power-transmission request information and the power-reception/power-transmission response information are exchanged. For example, the power consumer 1 belongs to the small regions RA and RB, so that the power consumer 1 does not exchange information with the power consumer 3 or 5 located outside the areas of the small regions RA and RB at least at the time of the above-mentioned exchange of information. In other words, first, the power consumer 1 attempts the power interchange within the areas of the small regions RA and RB, to which the power consumer 1 itself belongs. As a result of the above-mentioned exchange of information, when it is determined that the power consumer 1 cannot perform the power interchange in the small regions RA and RB, the power consumer 1 performs the next process such that the power consumer 1 may exchange information with the power consumer 3 or 5 located outside the areas of the small regions RA and RB on the basis of the information about the power consumer 3 or 5 received from the power consumer 2 or 4 being the other power consumer that belongs to the small regions RA and RB.

Subsequently, the necessary power interchange is performed among the power consumers 1 to 5 on the basis of the exchanged information. The monitoring control unit 110 (FIG. 4), for example, controls the power path in the actual interchange of power. The interchange of power is performed as described above.

According to this embodiment, initially, the exchange of information in such a way that the transmission of the power-reception/power-transmission request information and the transmission of the power-reception/power-transmission response information in response to the power-reception/power-transmission request information is performed within the limited area of each of the small regions RA to RD. In the case where the power interchange cannot be performed sufficiently within the area of each of the small regions RA to RD, the outside of the area of the specific small region may be searched for a power consumer by using the overlaps between the small regions RA to RD. Such a configuration can reduce the amount of information dealt at a time in comparison to the case in which all the power consumers 1 to 5 simply comprehensively exchange information with one another. Consequently, the calculation load of the EMS 100 is reduced. Furthermore, a destination of the interchange can be found in an early stage in comparison to a case in which one exchange of information at a time between the power consumers is successively performed. Therefore, the power consumer at the other end of the power interchange can be efficiently found.

The request information generated by the power-reception/power-transmission request information generation unit 106 may include information about a future time t and a shortage/surplus of power predicted to occur in one power consumer at the future time t. Such a configuration can previously generate the interchange plan for the power-shortage/surplus-power that may occur in the future.

The response information generated by the power-reception/power-transmission response information generation unit 107 may include information about the amount of power that can be transmitted or received by its own power consumer in response to the request information received from the other power consumer. Such a configuration can grasp the amount of interchangeable power in addition to whether or not the power interchange by the other power consumer is allowed for the occurrence of the power-shortage/surplus-power.

Although FIG. 11 indicates that the response information is transmitted to only the power consumer that has requested the power-reception/power-transmission and not transmitted to the power consumer that has not requested the power-reception/power-transmission, the response result of "0 kWh" may be transmitted to the power consumer that has not requested the power-reception/power-transmission.

<Second Embodiment>

Hereinafter, a configuration and operations of an EMS in this embodiment are described. Small regions in this embodiment have the same configuration as that shown in FIG. 3, but the details particularly related to discussions described below are supplementally described herein. The belonging region to which the power consumer 2 (one power consumer) belongs includes the small region RA (first belonging region) to which the power consumer 1 (first power consumer) belongs and the small region RD (second belonging region) to which the power consumer 1 does not belong. The power consumers 3 and 5 (a plurality of second power consumers) included in the other power consumers (namely, the power consumers 1, 3, and 5) belong to the small region RD, the other power consumers belonging to the belonging region of the power consumer 2.

The power consumers 1 to 5 having operational plans exemplified in FIG. 13 transmit power-reception/power-transmission requests shown in FIG. 14. For example, the power consumer 1 transmits the power-transmission request to the power consumers 2 and 4. The power consumers 2 and 4 do not have the surplus power as shown in FIG. 13, so that both of the power consumers 2 and 4 cannot satisfy the request.

With reference to FIG. 15, the power-reception/power-transmission response information generation unit 107 of the power consumer 2 herein judges whether or not the response information is to include the information about the power consumers 3 and 5 in the small region RD to which the power consumer 1 does not belong, of the small regions RA and RD to which the power consumer 2 belongs, in addition to the information about the amount of power of "0 kWh". Specifically, the power-reception/power-transmission response information generation unit 107 checks the presence or absence of the power-reception/power-transmission requests of the power consumers 3 and 5 managed by the power interchange planning unit 103, and includes, in the response information, only the information about the power consumer 5 that is a power consumer capable of satisfying the request of the power consumer 1, the response information being transmitted to the power-reception/power-transmission information transmitter 109. The information about the power consumer 5 is, for example, the identification ID for identifying the power consumer 5. In other words, when the power consumer 2 cannot handle the interchange of power based on the request information received from the power consumer 1, in only a case where the power consumer 5 can handle the interchange of power based on the request information received from the power consumer 1, the response information generated by the power-reception/power-transmission response information generation unit 107 includes the identification ID of the power consumer 5.

To put it another way while the supplementary descriptions at the beginning of this embodiment are taken into consideration, when the interchange of power based on the power-reception/power-transmission request information received from the power consumer 1 (first power consumer) cannot be handled, in a case where only some (namely, the power consumer 5) of the power consumers 3 and 5 (the plurality of second power consumers) can handle the interchange of power based on the power-reception/power-transmission request information received from the power consumer 1, the response information generated by the power-reception/power-transmission response information generation unit 107 includes the identification ID of only the power consumer 5 of the power consumers 3 and 5.

Similarly to the first embodiment, the response information generated by the power-reception/power-transmission response information generation unit 107 may include the information about the amount of power (of "(10 kWh)" in the diagram), which can be handled by the power consumer 5, of the interchange of power based on the request information received from the power consumer 1.

When there is no power consumer capable of satisfying the power-reception/power-transmission requests in the belonging region of the power consumer that has received the requests, the power consumer that has received the power-reception/power-transmission requests transmits all the information about the other power consumers belonging to its own belonging region to the power consumer that has transmitted the power-reception/power-transmission requests, similarly to the first embodiment.

If the EMS in the first embodiment is used, not only the information about the power consumer 5 but also the information about the power consumer 3 is transmitted to the power consumer 1 from the power consumer 2. However, the information about the power consumer 3 is not needed for this example, so that the amount of information dealt by the EMS unnecessarily increases. This embodiment can prevent such an increase in the amount of information.

<Third Embodiment>

Hereinafter, a configuration and operations of an EMS in this embodiment are described. Small regions in this embodiment have the same configuration as that shown in FIG. 3.

Also in this embodiment similar to the second embodiment, the power consumers 1 to 5 having the operational plans exemplified in FIG. 13 transmit the power-reception/power-transmission request shown in FIG. 14. For example, the power consumer 1 transmits the power-transmission request for 10 kW to the power consumers 2 and 4. The power consumers 2 and 4 at the time of receiving the request do not have the surplus power as shown in FIG. 13. Thus, both of the power consumers 2 and 4 cannot satisfy the request at this time.

In this embodiment, the power consumer 2 subsequently checks whether or not it can satisfy the request of the power consumer 1 by interchanging power with the other power consumer belonging to the small region to which the power consumer 1 does not belong. In the example of FIG. 14, the power consumer 2 transmits the power-transmission request to the power consumer 5 belonging to the small region RD to which the power consumer 1 does not belong, of the small regions RA and RD (FIG. 3) to which the power consumer 2 belongs. The power consumer 5 can satisfy the request, so that the power consumer 5 transmits the power-transmission response to the power consumer 2. The power consumer 2 that has received the response transmits the power-reception response to the power consumer 5 and transmits the power-transmission response to the power consumer 1. At this time, the response information generated by the power-reception/power-transmission response information generation unit 107 of each of the power consumers is as shown in FIG. 16.

Further, with reference to FIG. 4, the above-mentioned process is put in different words as described below.

The power-reception/power-transmission request information generation unit 106 of the power consumer 1 transmits the power-transmission request for 10 kW to the EMS 100 in the power consumer 2. The power-transmission request is received by the power-reception/power-transmission information receiver 108 of the power consumer 2 and managed by the interchange plan management unit 105. The operation planning unit 102 of the power consumer 2 treats 10 kW of the above-mentioned power-transmission request as the amount of demand power of the power consumer 1. As a result, the power interchange planning unit 103 of the power consumer 2 generates the interchange plan having the contents of the insufficient power of 10 kW of the power consumer 1. The power-reception/power-transmission request information generation unit 106 of the power consumer 2 generates, as the request information, the power-transmission request for 10 kW to the power consumer 5 on the basis of the contents of the insufficient power of 10 kW of the power consumer 1. The request information is transmitted by the power-reception/power-transmission information transmitter 109 of the power consumer 2.

The EMS 100 in the power consumer 5 that has received the above-mentioned request information can satisfy the request, so that the EMS 100 transmits the power-transmission response for 10 kW. The power-transmission response is received by the power-reception/power-transmission information receiver 108 of the power consumer 2 and managed by the interchange plan management unit 105. The operation planning unit 102 of the power consumer 2 treats 10 kW of the above-mentioned power-transmission response as the amount of generated power of the power consumer 5. As a result, the power interchange planning unit 103 of the power consumer 2 generates the interchange plan also having the contents of the surplus power of 10 kW of the power consumer 5. In other words, the power interchange planning unit 103 of the power consumer 2 generates the interchange plans having the contents of the insufficient power of 10 kW of the power consumer 1 and the surplus power of 10 kW of the power consumer 5. In this manner, the power interchange planning unit 103 in this embodiment generates not only the interchange plan of its own power consumer but also the interchange plan of the other power consumers. In other words, the power interchange planning unit 103 also generates the interchange plan for mediating the power interchange between the other power consumers.

The power-reception/power-transmission response information generation unit 107 of the power consumer 2 generates response information (FIG. 16) in which the insufficient power of 10 kW of the power consumer 1 and the surplus power of 10 kW of the power consumer 5 cancel each other out through itself as the medium. The generated response information is transmitted by the power-reception/power-transmission information transmitter 109 of the power consumer 2.

To put it another way about the power interchange described above while the supplementary descriptions at the beginning of the second embodiment are taken into consideration, in the case where the power consumer 2 (one power consumer) cannot handle the interchange of power based on the request information received from the power consumer 1 (first power consumer), the power consumer 2 performs the power interchange with the power consumer 5 (second power consumer) and then performs the power interchange with the power consumer 1 with the power from the power interchange with the power consumer 5. At this time, the response information generated by the power-reception/power-transmission response information generation unit 107 includes the information about the amount of power in the power interchange that can be performed by the power consumer 2 with each of the power consumers 1 and 5.

In the EMS 100 (FIG. 4) of the power consumer 2 that has received the power-transmission request from the power consumer 1, the region information management unit 104 may refer to the power-reception/power-transmission request information (information in the column of the "power consumer 2" in FIG. 14) managed by the interchange plan management unit 105 (FIG. 4), and extract a power consumer judged to be able to satisfy the request on the basis of the information above. The power-reception/power-transmission request information generation unit 106 generates the request information only for the destination extracted in the manner above, so that unnecessary transmission request is transmitted only to the power consumer 5 that has transmitted the power-reception request, and the power-transmission request is not transmitted to the power consumer that has not transmitted the power-reception request, so that the occurrence of the unnecessary communication can be avoided.

According to this embodiment, even in a case where the power consumer 2 cannot perform the power interchange with the power consumer 1 at the time of receiving the power-reception/power-transmission requests from the power consumer 1, the power consumer 2 performs the power interchange with the power consumer 5, so that the power consumer 2 can perform the power interchange with the power consumer 1. From another point of view, the power consumer 2 can serve as the medium in the power interchange between the power consumers 1 and 5 that do not belong to the common small region.

In addition, the power consumer 4 instead of the power consumer 2 may satisfy the power-transmission request of the power consumer 1. The response information generated by the power-reception/power-transmission response information generation unit 107 at this time is as shown in FIG. 17.

Next, the case in which the small regions RA to RD shown in FIG. 12 instead of the small regions RA to RD shown in FIG. 3 are formed is described as the modification. In this case, the power consumer 1 transmits the power-transmission request to only the power consumer 2 belonging to the same small region RA. The power consumer 2 at the time of receiving the request cannot satisfy the power-transmission request. Thus, the power consumer 2 transmits the power-transmission request to the power consumer 3 belonging to the small region RB to be able to satisfy the request of the power consumer 1. The power consumer 3 at the time of receiving the request cannot satisfy the power-transmission request. Thus, the power consumer 3 transmits the power-transmission request to the power consumer 4 belonging to the small region RC to be able to satisfy the request of the power consumer 2. The power consumer 4 at the time of receiving the request cannot satisfy the power-transmission request. Thus, the power consumer 4 transmits the power-transmission request to the power consumer 5 belonging to the small region RD to be able to satisfy the request of the power consumer 3. The power consumer 5 can satisfy the request, so that the power interchange is performed between the power consumer 4 and the power consumer 5. In other words, the power consumer 4 receives the surplus power from the power consumer 5. Then, the power consumer 4 performs the power interchange with the power consumer 3 with the received power. Similarly, the power consumers 3 and 2 perform the power interchange, and the power consumers 2 and 1 perform the power interchange. As a result, the power shortage of the power consumer 1 is eliminated. The final response information generated by the power-reception/power-transmission response information generation unit 107 at this time is as shown in FIG. 18.

<Fourth Embodiment>

In the first and second embodiments described above, the relative interchange of power between the power consumers (one-to-one power interchange) is performed. The relative interchange is not necessarily able to sufficiently eliminate the power-shortage/surplus-power in one power consumer. Thus, a power interchange between one power consumer and a plurality of power consumers is performed in a fourth embodiment.

In the EMS 100 in each of the power consumers 1 to 5 (FIG. 3), the operation planning unit 102 generates operational plans exemplified in FIG. 19, and the power interchange planning unit 103 generates power interchange plans shown in FIG. 20. As shown in FIG. 21, the power-reception/power-transmission request information generation unit 106 of the EMS 100 provided in the power consumer 1 in which the power shortage of 10 kWh occurs generates the power-transmission request information for the power consumers 2 and 4, and the power-reception/power-transmission information transmitter 109 transmits the power-transmission request information.

The power consumer 2 does not have the surplus power (FIG. 20), so that the power consumer 2 cannot satisfy the request of the power consumer 1 at all. Thus, as shown in FIG. 22, the power-reception/power-transmission response information generation unit 107 of the EMS 100 provided in the power consumer 2 includes, in the response information, the information that its own power-reception/power-transmission power is 0 kWh. Further, the power-reception/power-transmission response information generation unit 107 includes, in the response information, the information about the power consumer 3 and the power consumer 5 that belong to the small region RD to which the power consumer 2 itself belongs, and the response information is transmitted from the power-reception/power-transmission information transmitter 109 to the power consumer 1.

The surplus power occurs in the power consumer 4, but the amount of the surplus power is insufficient to completely satisfy the request of the power consumer 1. As shown in FIG. 22, the power-reception/power-transmission response information generation unit 107 of the EMS 100 in the power consumer 4 includes, in the response information, the information that the transmittable power by its own power consumer 4 is 3 kWh. Further, only the power transmission by its own power consumer 4 cannot eliminate the power shortage of the power consumer 1, so that the information (identification ID) of the power consumer 5 belonging to the small region RC to which the power consumer 4 itself belongs is included in the response information. The response information is transmitted from the power-reception/power-transmission information transmitter 109 to the power consumer 1.

The above-mentioned response information is received by the power-reception/power-transmission information receiver 108 in the EMS 100 provided in the power consumer 1, and the power-transmission request information for the remaining shortage of power of 7 kWh is generated for the power consumer 5. Then, the power-transmission request is transmitted from the power-reception/power-transmission information transmitter 109 to the power consumer 5.

The operations above of the EMS 100 in the power consumer 2 are more generally described below.

In a case where the interchange of power based on the power-reception/power-transmission request information received from the power consumer 1 (first power consumer) can be only partially handled, the response information generated by the power-reception/power-transmission response information generation unit 107 includes the information about the amount of power, which can be handled by the power consumer 2 (one power consumer), of the interchange of power based on the power-reception/power-transmission request information received from the power consumer 1 (first power consumer). In a case where the interchange of power based on the power-reception/power-transmission request information received from the power consumer 1 can be handed by only some (namely, the power consumer 5) of the power consumers 3 and 5 (the plurality of second power consumers), the response information generated by the power-reception/power-transmission response information generation unit 107 further includes the above-mentioned identification ID of only the power consumer 5 of the power consumers 3 and 5.

<Fifth Embodiment>

Hereinafter, a configuration and operations of an EMS in this embodiment are described. Small regions in this embodiment have the same configuration as that shown in FIG. 3.

Also in this embodiment similar to the fourth embodiment, in the EMS 100 in each of the power consumers 1 to 5 (FIG. 3), the operation planning unit 102 generates the operational plans exemplified in FIG. 19, and the power interchange planning unit 103 generates the power interchange plans shown in FIG. 20. As shown in FIG. 21, the power-reception /power-transmission request information generation unit 106 of the EMS 100 provided in the power consumer 1 in which the power shortage of 10 kWh occurs generates the power-transmission request information for 10 kWh to the power consumers 2 and 4, and the power-reception/power-transmission information transmitter 109 transmits the power-transmission request information.

The power consumer 2 does not have the surplus power (FIG. 20), so that the power consumer 2 cannot satisfy the request of the power consumer 1 at all. Thus, the power-reception/power-transmission response information generation unit 107 of the EMS 100 provided in the power consumer 2 transmits the power-transmission request to the power consumer 5 in the similar manner as the third embodiment. The EMS 100 in the power consumer 5 that has received the above-mentioned request information transmits, to the power consumer 2, a power-transmission response indicating that the request can be partially satisfied. Specifically, the response of the power transmission of 7 kW (part of 10 kW) is transmitted. In response, the power consumer 2 transmits a response of the power reception of 7 kW to the power consumer 5 and transmits a response of the power transmission of 7 kW to the power consumer 1. In other words, in the case where the amount of power in the power interchange that can be performed by the power consumer 2 (one power consumer) with the power consumer 5 (second power consumer) is the amount of power (7 kW) that is part of the amount of power (10 kW) based on the request information received from the power consumer 1 (first power consumer), the information about the amount of power in the power interchange that can be performed by the power consumer 2 with each of the power consumers 1 and 5 includes the information of 7 kW (part of the amount of power). The operation of the EMS 100 in the power consumer 2 at this time is almost the same as that in the third embodiment except for that part (7 kW) of the power-transmission request of the power consumer 1 instead of the whole (10 kW) of the power-transmission request is satisfied.

On the other hand, the surplus power occurs in the power consumer 4, but the amount is insufficient to completely satisfy the power-transmission request of the power consumer 1 for 10 kW. As shown in FIG. 23, the power-reception/power-transmission response information generation unit 107 of the EMS 100 in the power consumer 4 thus includes, in the response information, the information that the transmittable power by its own power consumer 4 is 3 kWh, and the response information is transmitted from the power-reception/power-transmission information transmitter 109 to the power consumer 1.

In the EMS 100 provided in the power consumer 1, the above-mentioned response information from each of the power consumers 2 and 4 is received by the power-reception/power-transmission information receiver 108. The power consumer 1 using the response information receives the power transmission of 7 kWh from the power consumer 2 and the power transmission of 3 kWh from the power consumer 4 to eliminate its own power shortage.

The power interchange between the power consumers 2 and 5 is performed as a preliminary stage for satisfying the power-transmission request of the power consumer 1 in the descriptions above, but the power interchange may be performed between the power consumers 4 and 5 instead. In this case, the power consumer 4 transmits, from the power-reception/power-transmission information transmitter 109 to the power consumer 1, the response information including the information about the total power (10 kWh) of the power (7 kWh) received from the power consumer 5 and its own surplus power (3 kWh). In this case, the final response information generated by the power-reception/power-transmission response information generation unit 107 is as shown in FIG. 24.

<Sixth Embodiment>

Figure 25:
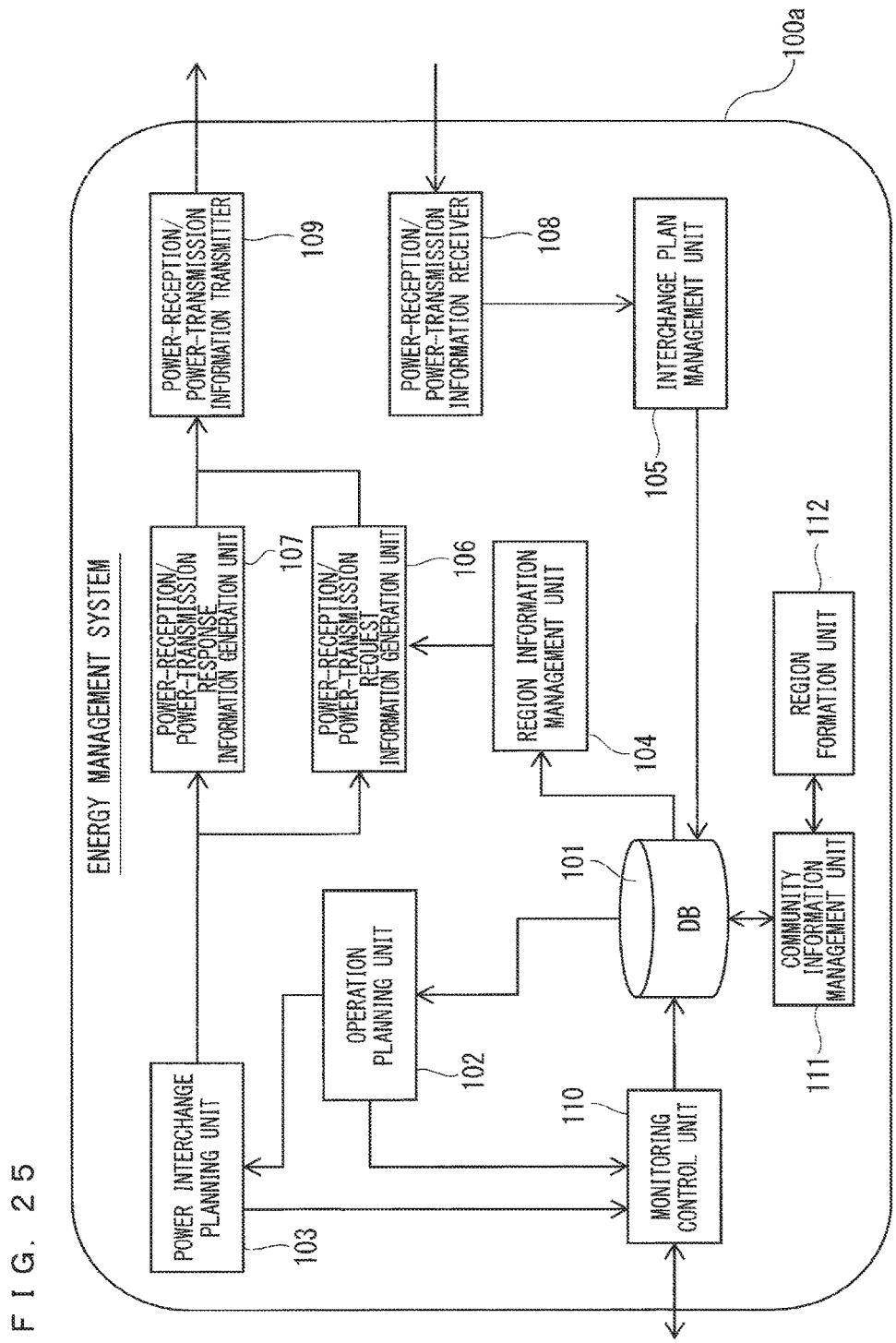
FIG. 25 is a diagram schematically showing a configuration of an energy management system according to a sixth embodiment of the present invention.

As shown in FIG. 25, an EMS 100a in this embodiment further includes a community information management unit 111 and a region formation unit 112 in addition to the structural components of the EMS 100 (FIG. 4).

Figure 26:
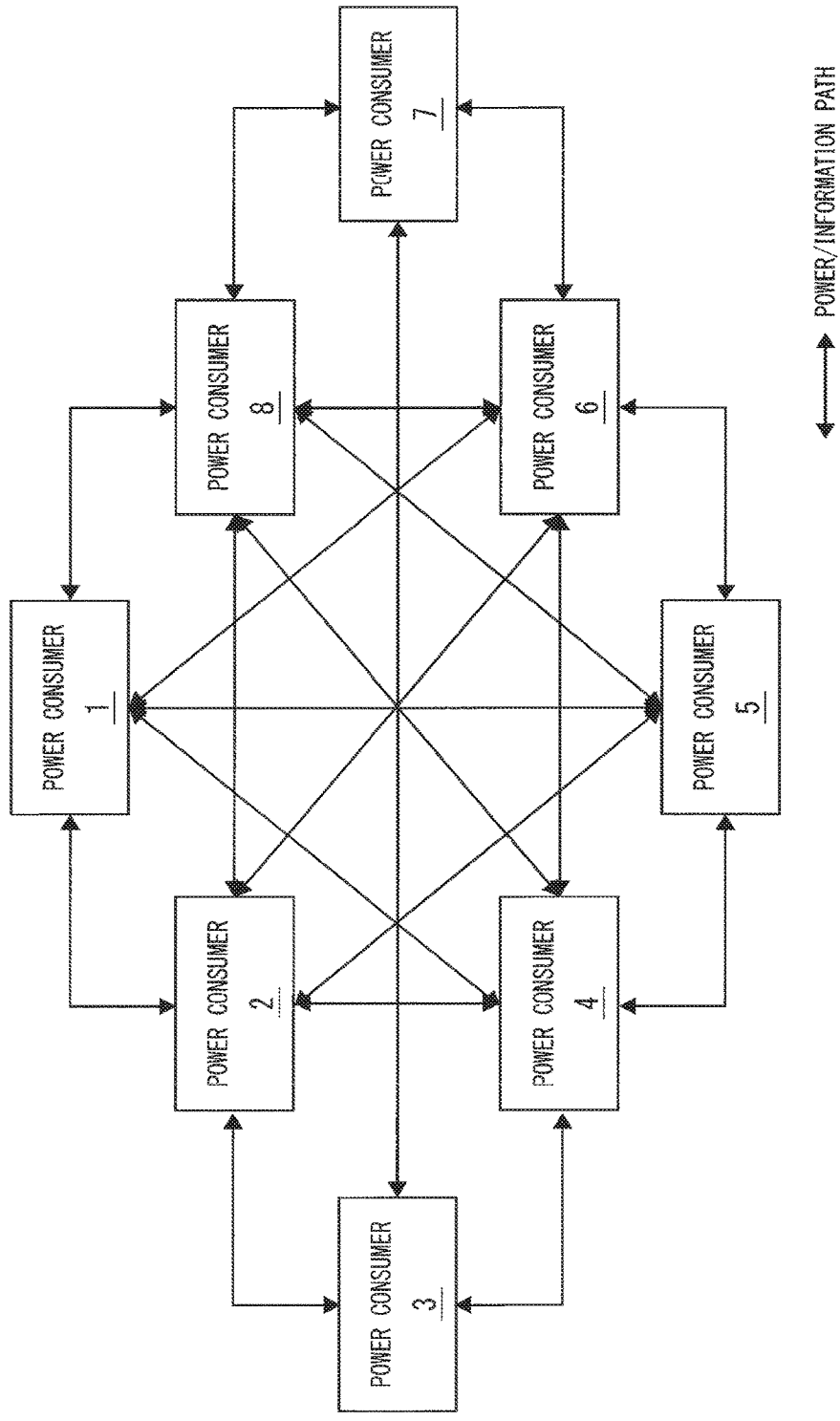
FIG. 26 is a diagram showing one example of a relationship between power consumers in the sixth embodiment of the present invention.

The community information management unit 111 manages information about all power consumers in one community and information about to which small region each of the power consumers belongs, namely, information about a configuration of the small regions. The term "community" refers to an area larger than the small region and refers to a group of power consumers as shown in FIG. 26. The region formation unit 112 judges which small region each of the power consumers should belong to, on the basis of the information about all the power consumers managed by the community information management unit 111. In other words, the community information management unit 111 manages the information about the plurality of small regions formed on the basis of the results judged by the region formation unit 112. The region information management unit 104 uses the information about the plurality of small regions managed by the community information management unit 111.

Figure 27:
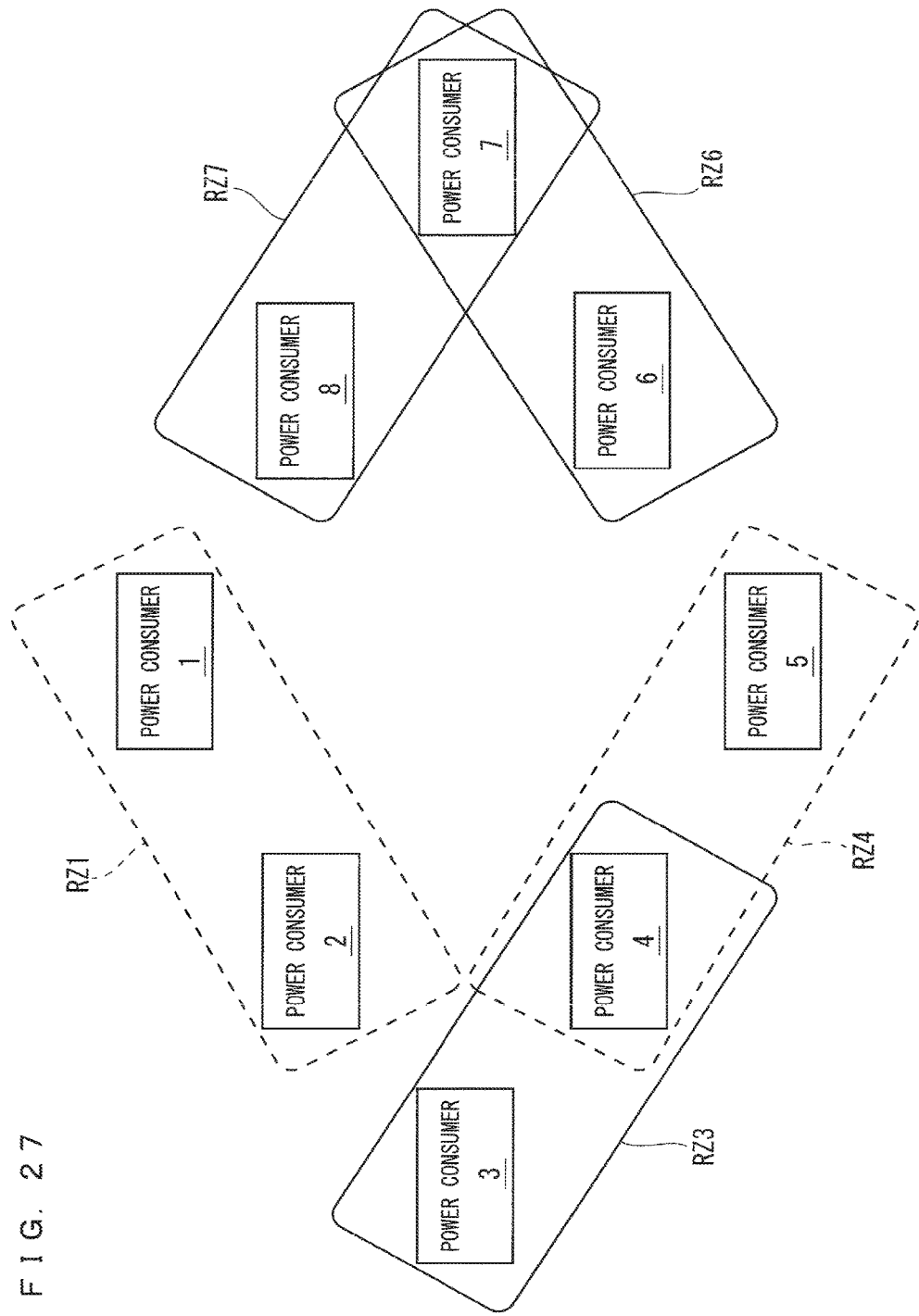
FIG. 27 is a diagram showing a configuration of small regions in a comparative example.
Figure 28:
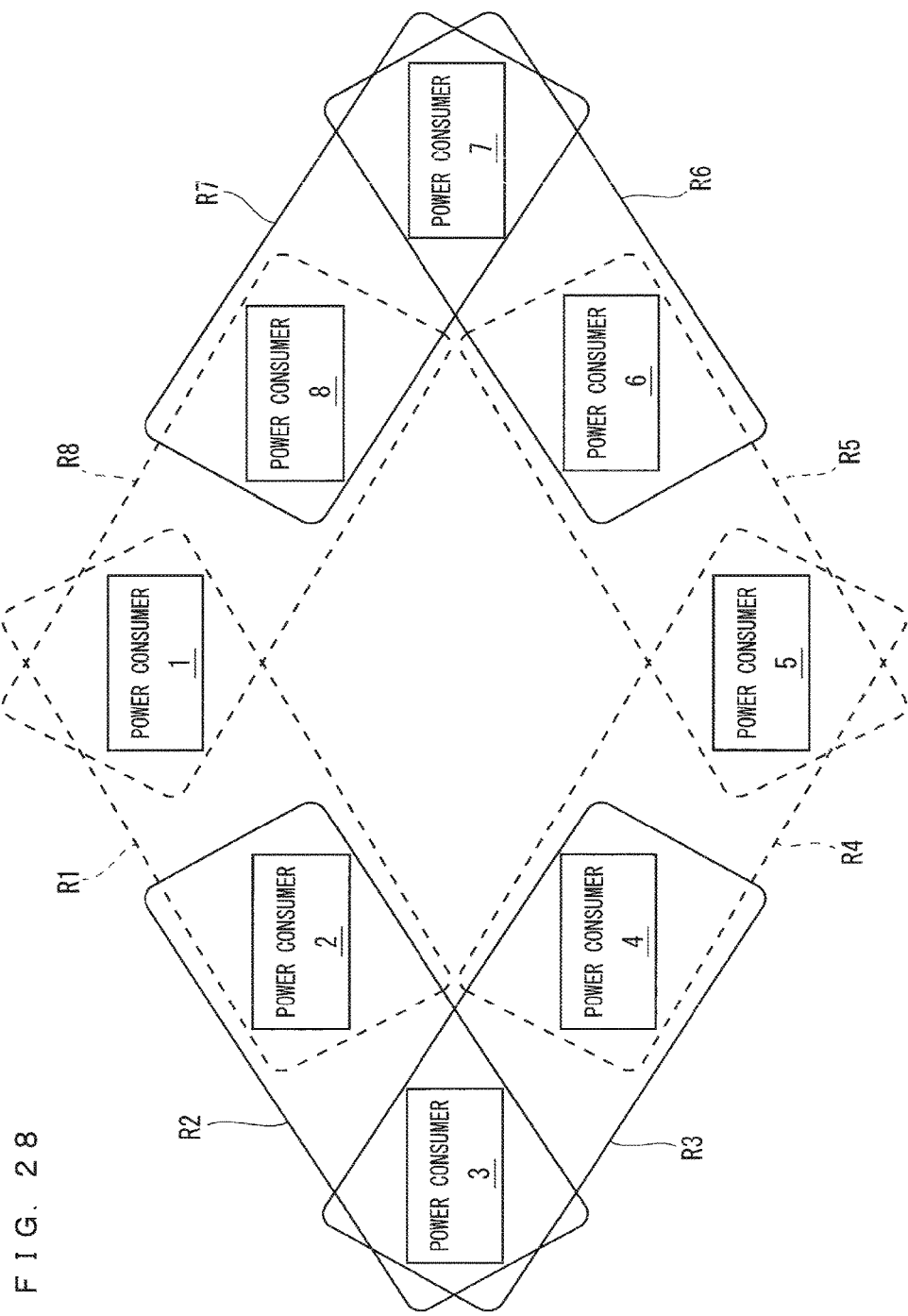
FIG. 28 is a diagram showing one example of a configuration of small regions formed by a region formation unit according to the sixth embodiment of the present invention.

When the power consumers form a new small region, the region formation unit 112 decides which small region each of the power consumers belongs to by determining whether it is better for the power consumer to belong to any of the small regions, which have already been formed, or by determining which power consumer is better to form a small region together. For example, for the power consumers as shown in FIG. 26, a plurality of groups of small regions, such as small regions RZ1 to RZ7 (FIG. 27), that are separated from one another are not preferably formed. The reason is that some power consumers cannot exchange information with one another on the assumption that the information is exchanged in each of the small regions. For example, the power consumer 1 cannot exchange information with each of the power consumers 3 to 8 as long as the exchange of information in each of the small regions is assumed. For this reason, if the power interchange needed by the power consumer 1 cannot be performed with the power consumer 2, the destination to which the power-reception/power-transmission requests are transmitted by the power consumer 1 needs to be decided randomly from the power consumers 3 to 8, and a power consumer at the other end of the power interchange cannot be found efficiently. Thus, such as small regions R1 to R8 shown in FIG. 28, all the small regions are integrated by the connections of overlaps between the small regions, to thereby form one group in this embodiment. In other words, the small regions are formed so as not to form portions thereof isolated from one another. The small regions to which the power consumers belong are formed so as not to be isolated from one another in this manner, so that the exchange of information between the power consumers and the decision on the power consumer at the other end of the interchange can be performed efficiently.

The information about all the power consumers managed by the community information management unit 111 may further include information about a distance between the power consumers, a transmission loss in the power interchange, a transmission capacity of a transmission line between the power consumers, or the like. In this case, the region formation unit 112 may make more preferable combinations of the small regions from all the power consumers by using at least one piece of the information. Examples of the preferable combinations of the small regions include combinations so as to minimize the sum of distance between the power consumers in the small regions, combinations so as to minimize the transmission loss in the power interchange in the small regions, or combinations so as to maximize the transmission capacity of the transmission line between the power consumers. Furthermore, these perspectives may be combined, and the small regions may be evaluated or adjusted.

The information about all the power consumers managed by the community information management unit 111 may further include information about an equipment configuration of the distributed power supply 21 (FIG. 1) held in the power consumer. The region formation unit 112 using the information may make more preferable combinations of the small regions while taking the configuration of the power supply equipment between the power consumers into consideration. For example, it is assumed that the power consumer 1 holds only the solar-electric power generation as the distributed power supply 21 and the power consumer 2 holds the storage battery as the distributed power supply 21. In this case, the power consumers 1 and 2 form the same small region, so that the storage battery in the power consumer 2 can be charged with the surplus power from the solar-electric power generation in the power consumer 1. This can eliminate the surplus in the above-mentioned small region. If both of the power consumer 1 and the power consumer 2 hold only the solar-electric power generation, the power consumer 2 cannot receive and store the surplus power occurring in the power consumer 1. Consequently, the surplus is hardly eliminated in the small region, and thus the frequency of the power interchange with a power consumer belonging to the other small region increases, thereby resulting in low efficiency. For this reason, the region formation unit 112 forms a small region that includes at least one power consumer holding the distributed power supply 21 capable of storing power such as the storage battery, instead of forming a small region with only the power consumers holding the distributed power supply 21 capable of only generating power.

By using the information about the distance between the power consumers, the distance between the power consumers can be shortened. This can minimize a delay of transmission and reception of information. Thus, the exchange of information between the power consumers can be performed more efficiently.

By using the information about the transmission loss that may occur between the power consumers, the transmission loss in the power interchange can be reduced. Thus, not only the exchange of information but also the exchange of power can be performed efficiently.

By using the information about the transmission capacity of the power path between the power consumers, the amount of receivable-power/transmittable-power in the power interchange can be increased.

By using the information about the equipment configuration of the distributed power supply in the power consumer, the power interchange can be easily completed in the small regions. Thus, the exchange of power can be performed efficiently.

In addition, the community information management unit 111 and the region formation unit 112 may be external functions of the EMS 100a of the present invention, and, for example, may be provided as external services such as cloud services.

In addition, according to the present invention, the above preferred embodiments can be arbitrarily combined, or each preferred embodiment can be appropriately varied or omitted within the scope of the invention. While the invention has been shown and described in detail, the foregoing description is in all aspects illustrative and not restrictive. It is therefore understood the numerous modifications and variations can be devised without departing from the scope of the invention.

DESCRIPTION OF NUMERALS

100, 100a energy management system (EMS); 101 database; 102 operation planning unit; 103 power interchange planning unit; 104 region information management unit; 105 interchange plan management unit; 106 power-reception/power-transmission request information generation unit; 107 power-reception/power-transmission response information generation unit; 108 power-reception/power-transmission information receiver; 109 power-reception/power-transmission information transmitter; 110 monitoring control unit; 111 community information management unit; 112 region formation unit.

The invention claimed is:

1. An energy management system to allow for efficient power interchange through a reduction of communication congestion, the energy management system being provided in one power consumer in a case where the energy management system is provided in each of a plurality of power consumers to manage a power interchange between said plurality of power consumers that each include a distributed power supply and load equipment and that are connected to each other by a power path and an information path, said energy management system comprising:
   an information transmitter to transmit information to said information path;
   an information receiver to receive information from said information path; and
   a region information manager to manage at least part of information about a plurality of small regions that each include said plurality of power consumers,
   wherein each of said plurality of small regions overlaps at least any of the other small regions of said plurality of small regions, and
   said region information manager manages
      information about at least one belonging region of said plurality of small regions, said one power consumer belonging to said at least one belonging region, and
      information specifying, in addition to said one power consumer, at least one other power consumer of said plurality of power consumers, said other power consumer belonging to said at least one belonging region.

2. The energy management system according to claim 1, further comprising:
   an operation planner to generate operational plans of said distributed power supply and said load equipment that are provided in said one power consumer;
   a power interchange planner to generate a power interchange plan of said one power consumer on the basis of said operational plans planned by said operation planner;
   a request information generator to generate request information having contents based on said power interchange plan, the request information being transmitted by said information transmitter to said other power consumer specified by said region information manager;
   an interchange plan manager to manage information having contents based on a power interchange plan of said other power consumer and being received by said information receiver from said other power consumer; and
   a response information generator to generate response information transmitted by said information transmitter to said other power consumer on the basis of the power interchange plan of each of said one power consumer and said other power consumer.

3. The energy management system according to claim 2, wherein said request information generated by said request information generator includes information about a future time and about a shortage and a surplus of power predicted to occur in said one power consumer at said future time.

4. The energy management system according to claim 2, wherein said response information generated by said response information generator includes information about an amount of power that can be transmitted or received by said one power consumer in response to said request information received from said other power consumer.

5. The energy management system according to claim 2, wherein the region information manager holds an identification ID for identifying at least one of the other power consumers.

6. The energy management system according to claim 5, wherein
   said at least one belonging region to which said one power consumer belongs includes a first belonging region to which a first power consumer included in said other power consumer belongs and a second belonging region to which a second power consumer included in said other power consumer belongs and said first power consumer does not belong, and
   in a case where said one power consumer cannot handle the interchange of power based on said request information received from said first power consumer, said response information generated by said response information generator includes said identification ID for identifying said second power consumer.

7. The energy management system according to claim 5, wherein
   said at least one belonging region to which said one power consumer belongs includes a first belonging region to which a first power consumer included in said other power consumer belongs and at least one second belonging region to which said first power consumer does not belong, a plurality of second power consumers included in said other power consumer belonging to said second belonging region, and in a case where only some of said second power consumers can handle the interchange of power based on said request information received from said first power consumer when the interchange of power based on said request information received from said first power consumer cannot be handled, said response information generated by said response information generator includes said identification ID of only some of said second power consumers.

8. The energy management system according to claim 6, wherein said response information generated by said response information generator includes information about an amount of power, which can be handled by said second power consumer, of the interchange of power based on said request information received from said first power consumer.

9. The energy management system according to claim 5, wherein said at least one belonging region to which said one power consumer belongs includes a first belonging region to which a first power consumer included in said other power consumer belongs and at least one second belonging region to which said first power consumer does not belong, a plurality of second power consumers included in said other power consumer belonging to said second belonging region, and in a case where the interchange of power based on said request information received from said first power consumer can be only handled, said response information generated by said response information generator includes information about an amount of power, which can be handled by said one power consumer, of the interchange of power based on said request information received from said first power consumer, and in a case where the interchange of power based on said request information received from said first power consumer can be handled by only some of said second power consumers, said response information generated by said response information generation unit further includes said identification ID of only some of said second power consumers.

10. The energy management system according to claim 5, wherein said at least one belonging region to which said one power consumer belongs includes a first belonging region to which a first power consumer included in said other power consumer belongs and a second belonging region to which a second power consumer included in said other power consumer belongs and said first power consumer does not belong, in a case where said one power consumer cannot handle the interchange of power based on said request information received from said first power consumer, said one power consumer performs power interchange with said second power consumer and then performs power interchange with said first power consumer with the power from the power interchange with said second power consumer, and said response information generated by said response information generator includes information about an amount of power in the power interchange that can be performed by said one power consumer with each of said first power consumer and said second power consumer.

11. The energy management system according to claim 10, wherein in the case where said amount of power in said power interchange that can be performed by said one power consumer with said second power consumer is an amount of power that is part of an amount of power based on said request information received from said first power consumer, said information about the amount of power in the power interchange includes information about said part of the amount of power.

12. The energy management system according to claim 1, further comprising:

a community information manager to manage information about said plurality of power consumers and information about to which small region each of said plurality of power consumers belongs to; and a region former to judge which small region each of said plurality of power consumers should belong to, on the basis of the information about said plurality of power consumers managed by said community information manager, wherein said community information manager manages the information about said plurality of small regions formed on the basis of the results judged by said region former, and said region information manager uses the information about said plurality of small regions managed by said community information manager.

13. The energy management system according to claim 12, wherein the information about said plurality of power consumers managed by said community information manager includes information about a distance between said power consumers.

14. The energy management system according to claim 12, wherein the information about said plurality of power consumers managed by said community information manager includes information about a transmission loss that may occur between said power consumers.

15. The energy management system according to claim 12, wherein the information about said plurality of power consumers managed by said community information manager includes information about a transmission capacity of said power path between said power consumers.

16. The energy management system according to claim 12, wherein the information about said plurality of power consumers managed by said community information manager includes information about an equipment configuration of the distributed power supply held by each of said power consumers.

17. A power interchange method that reduces communication congestion and is performed between a plurality of power consumers that each include a distributed power supply and load equipment and that are connected to each other by a power path and an information path, said power interchange method comprising:

forming a plurality of small regions that each include said plurality of power consumers, each of said plurality of power consumers belonging to at least one of said plurality of small regions, each of said plurality of small regions overlapping at least any of the other small regions of said plurality of small regions;

exchanging, with a transmitter and a receiver, information between said plurality of power consumers using said information path within an area of each of said small regions; and interchanging power between said plurality of power consumers after said exchanging information using said information path.

* * * * *